United States Patent
Subramanian et al.

(10) Patent No.: US 11,422,903 B2
(45) Date of Patent: Aug. 23, 2022

(54) MAINTAINING AND RECOMPUTING REFERENCE COUNTS IN A PERSISTENT MEMORY FILE SYSTEM

(71) Applicant: NetApp Inc., Sunnyvale, CA (US)

(72) Inventors: Ananthan Subramanian, San Ramon, CA (US); Matthew Fontaine Curtis-Maury, Apex, NC (US); Vinay Devadas, Apex, NC (US)

(73) Assignee: NetApp Inc., San Jose, CA (US)

( * ) Notice: Subject to any disclaimer, the term of this patent is extended or adjusted under 35 U.S.C. 154(b) by 195 days.

(21) Appl. No.: 16/944,001

(22) Filed: Jul. 30, 2020

(65) Prior Publication Data
US 2022/0035717 A1    Feb. 3, 2022

(51) Int. Cl.
| | |
|---|---|
| *G06F 11/00* | (2006.01) |
| *G06F 11/14* | (2006.01) |
| *G06F 11/07* | (2006.01) |
| *G06F 12/02* | (2006.01) |
| *G06F 12/0817* | (2016.01) |
| *G06F 12/0882* | (2016.01) |
| *G06F 11/30* | (2006.01) |

(52) U.S. Cl.
CPC ...... *G06F 11/1471* (2013.01); *G06F 11/0772* (2013.01); *G06F 11/3037* (2013.01); *G06F 12/0246* (2013.01); *G06F 12/0824* (2013.01); *G06F 12/0882* (2013.01)

(58) Field of Classification Search
CPC ............. G06F 11/0772; G06F 11/1471; G06F 11/3037
See application file for complete search history.

(56) References Cited

U.S. PATENT DOCUMENTS

| | | | | |
|---|---|---|---|---|
| 8,549,222 B1* | 10/2013 | Kleiman | ............... | G06F 12/126 711/113 |
| 8,819,386 B1* | 8/2014 | Mather | ............... | G06F 12/0223 711/202 |
| 10,956,324 B1* | 3/2021 | Giles | ...................... | G06F 12/128 |
| 2011/0035548 A1* | 2/2011 | Kimmel | .................. | G06F 3/061 707/823 |
| 2016/0077922 A1* | 3/2016 | Yoon | ................... | G06F 11/1072 711/162 |
| 2018/0285276 A1* | 10/2018 | Kumar | .................... | G06F 21/55 |
| 2019/0050344 A1* | 2/2019 | Puthiyedath | .......... | G06F 12/109 |
| 2020/0045010 A1* | 2/2020 | Sun | ........................ | G06F 3/0643 |

* cited by examiner

*Primary Examiner* — Joshua P Lottich
(74) *Attorney, Agent, or Firm* — Cooper Legal Group, LLC

(57) ABSTRACT

Techniques are provided for maintaining and recomputing reference counts in a persistent memory file system of a node. Primary reference counts are maintained for pages within persistent memory of the node. In response to receiving a first operation to link a page into a persistent memory file system of the persistent memory, a primary reference count of the page is incremented before linking the page into the persistent memory file system. In response to receiving a second operation to unlink the page from the persistent memory file system, the page is unlinked from the persistent memory file system before the primary reference count is decremented. Upon the node recovering from a crash, the persistent memory file system is traversed in order to update shadow reference counts for the pages with correct reference count values, which are used to overwrite the primary reference counts with the correct reference count values.

20 Claims, 15 Drawing Sheets

MAINTAINING AND RECOMPUTING REFERENCE COUNTS IN A PERSISTENT MEMORY FILE SYSTEM

BACKGROUND

A node, such as a server, a computing device, a virtual machine, etc., may host a storage operating system. The storage operating system may be configured to store data on behalf of client devices, such as within volumes, aggregates, storage devices, cloud storage, locally attached storage, etc. In this way, a client can issue read and write operations to the storage operating system of the node in order to read data from storage or write data to the storage. The storage operating system may implement one or more file systems through which the data is organized and accessible to the client devices. A file system may be tailored for managing the storage and access of data within a particular type of storage media. For example, a storage file system may be tailored for managing block-addressable storage, such as disk drives, solid state drives, etc. In another example, a persistent file system may be tailored for managing byte-addressable storage, such as persistent memory.

DETAILED DESCRIPTION

Figure 1:
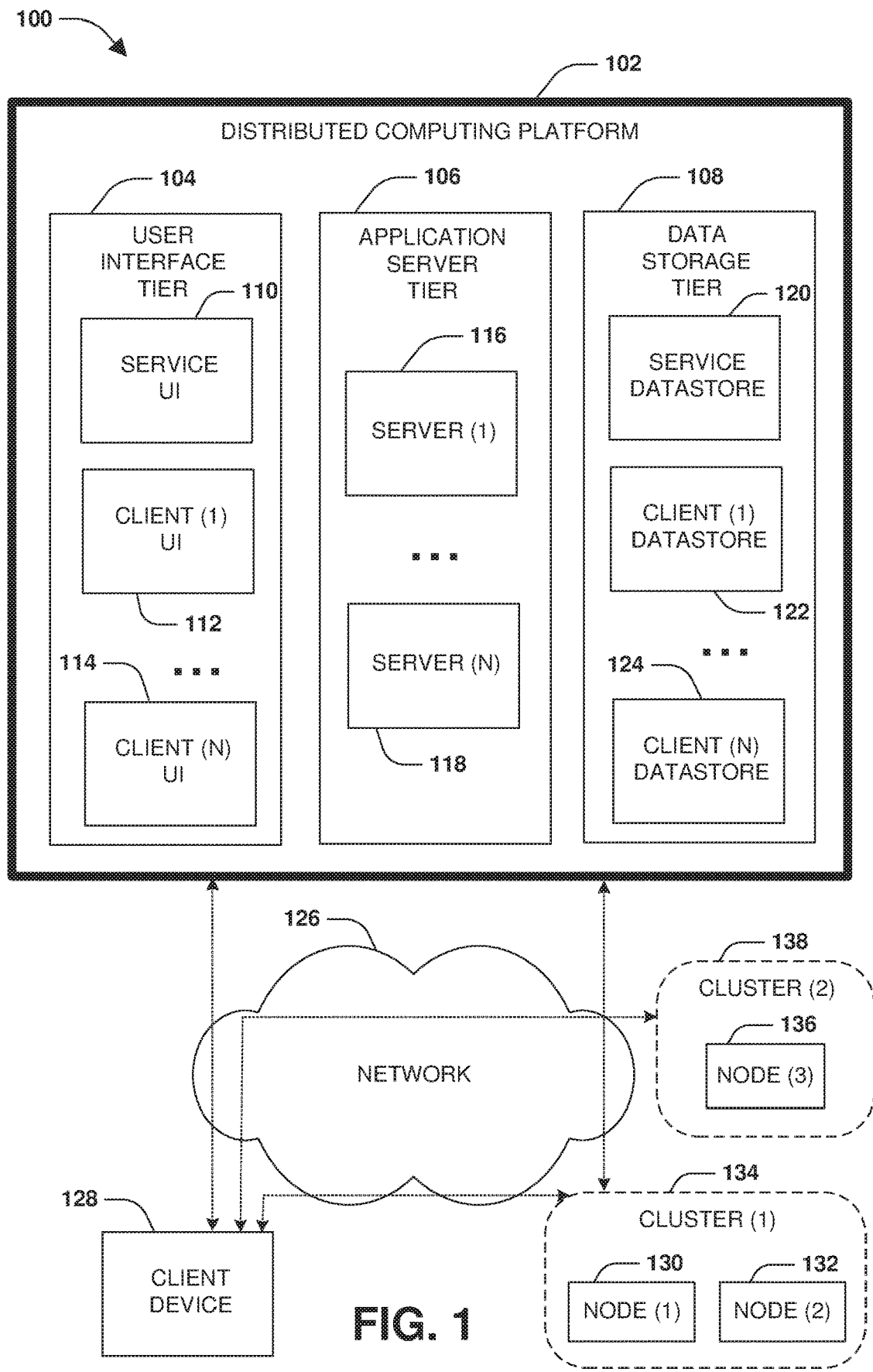
FIG. 1 is a block diagram illustrating an example computing environment in which an embodiment of the invention may be implemented.

The techniques described herein are directed to maintaining and recomputing reference counts in a persistent memory file system of a node. A reference count of a page within the persistent memory file system indicates how many times data within the page is referenced by an active file system and/or one or more snapshots and/or one or more file clones. If the reference count becomes incorrect, such as due to a failure (e.g., the node crashing) occurring while the reference count is being updated, then the reference count may be higher or lower than the correct value. If the reference count is too large, then memory leaks can occur where the page is retained within persistent memory even though nothing is using/referencing the data within the page. If the reference count is too small, then data corruption can occur where the page is freed and reused to store different data even though the data that was freed is still being used/referenced.

Determining the correct reference counts for the pages after the failure may be difficult or impossible after recovering from the failure due to how persistent memory can persist operations in any order and does not guarantee/control the order with which the operations are persisted. Thus, a system may not be able to determine whether an in-progress update to a reference count during the failure was updated or not. For example, if the system sends a set of operations to the persistent memory for modifying one or more reference counts and the node crashes before an acknowledgement is received from the persistent memory that the set of operations successfully completed, then the system will have no indication as to which operations were completed to modify the one or more reference counts and which failed to complete at the time of the node crashing.

In contrast, various embodiments of the present invention maintain reference counts in a manner that allows for correct reference counts to be determined after recovering from a failure of the node. During normal operation, reference counts are maintained in such a manner that a current value of a reference count will be either the correct value or larger than the correct value, but not smaller than the correct value. This is achieved by incrementing a primary reference count of a page before linking the page into the persistent memory file system, and unlinking the page from the persistent memory file system before decrementing the primary reference count.

If the node has failed and is recovering from the failure, the persistent memory file system is traversed to identify correct reference counts for pages within the persistent memory file system. In particular, the persistent memory file system is traversed to update shadow reference counts of pages based upon a number of times the pages are referenced (seen) by the persistent memory file system during the traversal. A shadow reference count of a page may be a numerical value maintained by a scanner performing the traversal to indicate a number of times the page is referenced by the persistent memory file system (e.g., a number of times the traversal encounters the page). The shadow reference counts may be updated as the node is actively processing client I/O directed to the persistent memory file system so that client I/O latency and performance is not impacted. Once the shadow reference counts have been updated by the traversal, values of primary reference counts of the pages are replaced with values of the shadow reference counts that have been determined as correct reference counts. In this way, the primary reference counts will reflect the correct reference counts of the pages, which avoids memory leaks and data corruption otherwise resulting from incorrect reference counts.

Various embodiments of the present technology provide for a wide range of technical effects, advantages, and/or improvements to computing systems and components. For example, various embodiments include one or more of the following technical effects, advantages, and/or improvements: 1) integration of a counting scheme that allows for accurate reference counting even after a failure (e.g., the use of shadow reference counts during traversal of a persistent memory file system by a scanner); 2) use of unconventional and non-routine computer operations to maintain and recompute reference counts in a persistent memory file system (e.g., implementation of the scanner to traverse the persistent memory file system to recompute reference counts); 3) changing the manner in which a computing system reacts to a memory failure (e.g., invoking the scanner to traverse the persistent memory file system to recompute reference counts in response to recovering from the memory failure); and/or 4) changing the manner in which a components of a distributed, cloud-based persistent memory system tracks use of files (e.g., utilizing shadow reference counts in addition to regular primary reference counts).

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc.

A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage.

The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In some embodiments, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices.

A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In some embodiments, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

Deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device.

Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an embodiment of background deduplication, data blocks that are duplicated between files are rearranged within storage units such that one copy of the data occupies physical storage. References to the single copy can be inserted into a file system structure such that all files or containers that contain the data refer to the same instance of the data.

Deduplication can be performed on a data storage device block basis. In an embodiment, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, and the like. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number.

For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file.

The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In some embodiments, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132.

In the LRSE protocol, the second node 132 maintains a history buffer that keeps track of data blocks that the second node 132 has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an embodiment, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an embodiment, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an embodiment, various types of synchronization may be implemented by a synchronization module associated with the storage operating system. In an embodiment, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an embodiment, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an embodiment, the storage operating system may be implemented for the distributed computing platform 102. The storage operating system may allow client devices to access data stored within the distributed computing platform 102 using various types of protocols, such as a Network File System (NFS) protocol, a Server Message Block (SMB)

protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an embodiment, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
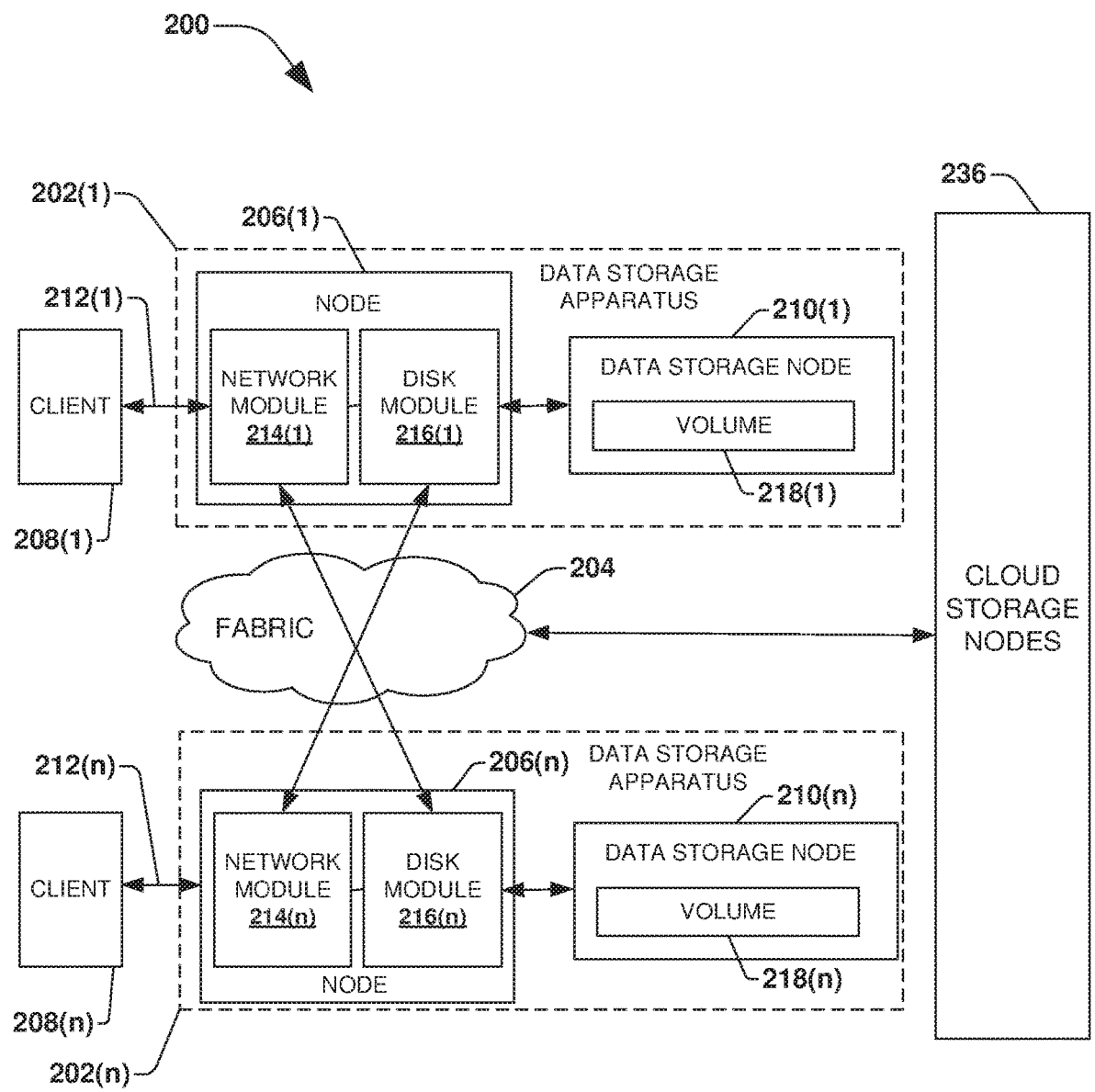
FIG. 2 is a block diagram illustrating a network environment with exemplary nodes.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, nodes 206(1)-206(n), for example), although any number of other elements or components can also be included in the clustered network environment 200 in other examples. This technology provides a number of advantages including methods, non-transitory computer readable media, and computing devices that implement the techniques described herein.

In this example, nodes 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The nodes 206(1)-206(n) may be implemented as hardware, software (e.g., a storage virtual machine), or combination thereof.

The data storage apparatuses 202(1)-202(n) and/or nodes 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The nodes 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such nodes 206(1)-206(n) can be attached to the cluster fabric 204 at a connection point, redistribution point, or communication endpoint, for example. One or more of the nodes 206(1)-206(n) may be capable of sending, receiving, and/or forwarding information over a network communications channel, and could comprise any type of device that meets any or all of these criteria.

In an embodiment, the nodes 206(1) and 206(n) may be configured according to a disaster recovery configuration whereby a surviving node provides switchover access to the data storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the nodes 206(1)-206(n) can be configured based on another type of replication arrangement (e.g., to facilitate load sharing). Additionally, while two nodes are illustrated in FIG. 2, any number of nodes or data storage apparatuses can be included in other examples in other types of configurations or arrangements.

As illustrated in the clustered network environment 200, nodes 206(1)-206(n) can include various functional components that coordinate to provide a distributed storage architecture. For example, the nodes 206(1)-206(n) can include network modules 214(1)-214(n) and disk modules 216(1)-216(n). Network modules 214(1)-214(n) can be configured to allow the nodes 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the nodes 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on nodes 206(1)-206(n), the data storage devices 210(1)-210(n) can appear as locally attached. In this manner, different nodes 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different nodes can have a different number of network and disk modules, and the same node computing device can have a different number of network modules than disk modules.

Further, one or more of the client devices 208(1)-208(n) can be networked with the nodes 206(1)-206(n) in the cluster, over the storage connections 212(1)-212(n). As an example, respective client devices 208(1)-208(n) that are networked to a cluster may request services (e.g., exchanging of information in the form of data packets) of nodes 206(1)-206(n) in the cluster, and the nodes 206(1)-206(n) can return results of the requested services to the client devices 208(1)-208(n). In one example, the client devices 208(1)-208(n) can exchange information with the network modules 214(1)-214(n) residing in the nodes 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example, volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the nodes 206(1)-206(n) connects to a volume, a connection between the one of the nodes 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
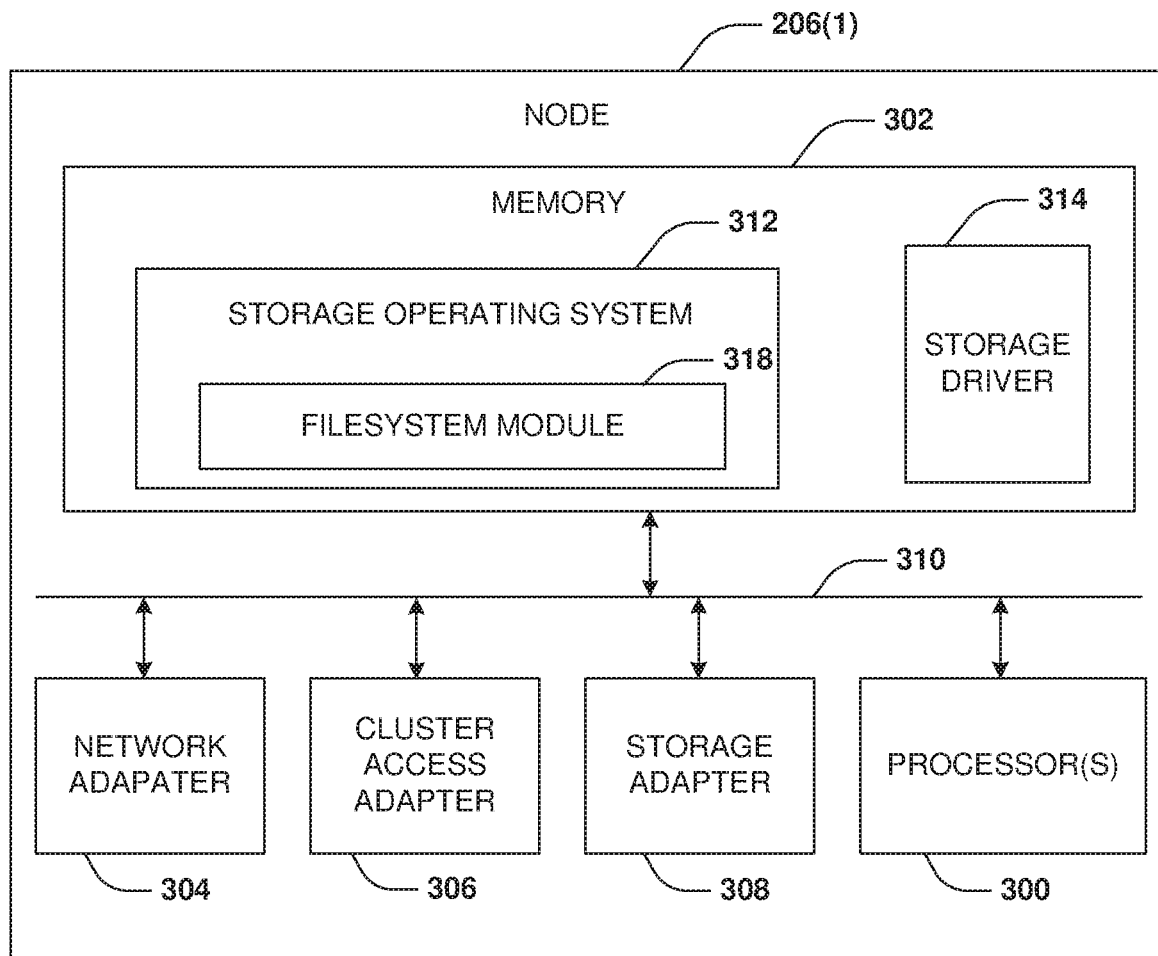
FIG. 3 is a block diagram illustrating an example of various components that may be present within a node that may be used in accordance with an embodiment of the invention.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
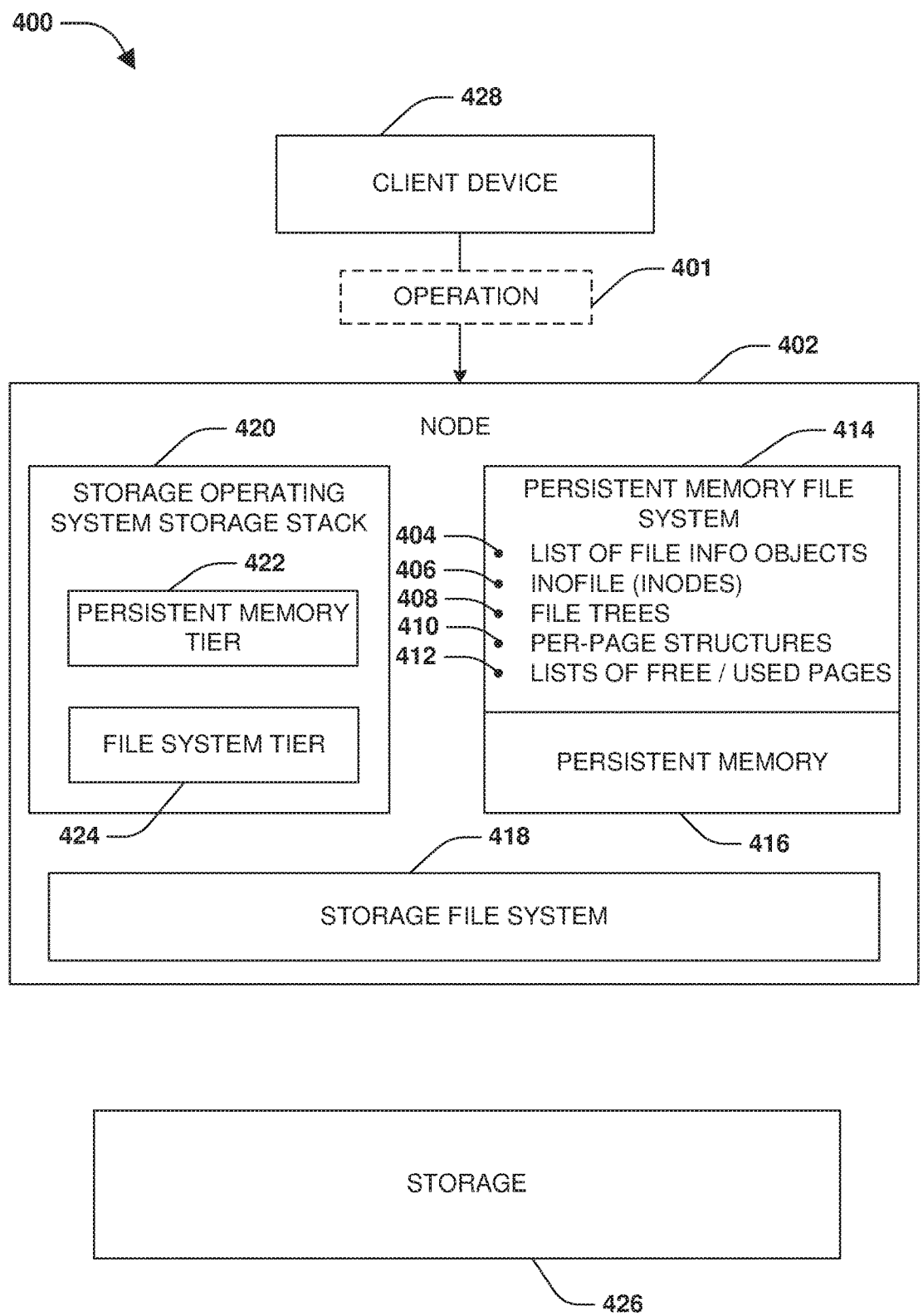
FIG. 4 is a block diagram illustrating an example of various components of system for implementing a persistent memory tier and a file system tier in accordance with an embodiment of the invention.

FIG. 4 illustrates a system 400 comprising node 402 that implements a file system tier 424 to manage storage 426 and a persistent memory tier 422 to manage persistent memory 416 of the node 402. The node 402 may comprise a server, an on-premise device, a virtual machine, computing resources of a cloud computing environment (e.g., a virtual machine hosted within the cloud), a computing device, hardware, software, or combination thereof. The node 402 may be configured to manage the storage and access of data on behalf of clients, such as a client device 428. The node 402 may host a storage operating system configured to store and manage data within and/or across various types of storage devices, such as locally attached storage, cloud storage, disk storage, flash storage, solid state drives, tape, hard disk drives, etc. For example, the storage operating system of the node 402 may store data within storage 426, which may be composed of one or more types of block-addressable storage (e.g., disk drive, a solid state drive, etc.) or other types of storage. The data may be stored within storage objects, such as volumes, containers, logical unit numbers (LUNs), aggregates, cloud storage objects, etc. In an embodiment, an aggregate or other storage object may be comprised of physical storage of a single storage device or storage of multiple storage devices or storage providers.

The storage operating system of the node 402 may implement a storage file system 418 that manages the storage and client access of data within the storage objects stored within the storage 426 associated with the node 402. For example, the client device 428 may utilize the storage file system 418 in order to create, delete, organize, modify, and/or access files within directories of a volume managed by the storage file system 418. The storage operating system may be associated with a storage operating system storage stack 420 that comprises a plurality of levels through which operations, such as read and write operations from client devices, are processed. An operation may first be processed by a highest level tier, and then down through lower level tiers of the storage operating system storage stack 420 until reaching a lowest level tier of the storage operating system storage stack 420. The storage file system 418 may be managed by a file system tier 424 within the storage operating system storage stack 420. When an operation reaches the file system tier 424, the operation may be processed by the storage file system 418 for storage within the storage 426.

The storage file system 418 may be configured with commands, APIs, data structures (e.g., data structures used to identify block address locations of data within the storage 426), and/or other functionality (e.g., functionality to access certain block ranges within the storage 426) that is tailored to the block-addressable storage 426. Because the storage file system 418 is tailored for the block-addressable semantics of the storage 426, the storage file system 418 may be unable to utilize other types of storage that use a different addressing semantics such as persistent memory 416 that is byte-addressable. The persistent memory 416 provides relatively lower latency and faster access speeds than the block-addressable storage 426 that the storage file system 418 is natively tailored to manage. Because the persistent memory 416 is byte-addressable instead of block-addressable, the storage file system 418, data structures of the storage file system 418 used to locate data according to block-addressable semantics of the storage 426, and the commands to store and retrieved data from the block-addressable storage 426 may not be able to be leveraged for the byte-addressable persistent memory 416.

Accordingly, a persistent memory file system 414 and the persistent memory tier 422 for managing the persistent memory file system 414 are implemented for the persistent memory 416 so that the node 402 can use the persistent memory file system 414 to access and manage the persistent memory 416 or other types of byte-addressable storage for storing user data. The persistent memory 416 may comprise memory that is persistent, such that data structures can be stored in a manner where the data structures can continue to be accessed using memory instructions and/or memory APIs even after the end of a process that created or last modified the data structures. The data structures and data will persist even in the event of a power loss, failure and reboot, etc. The persistent memory 416 is non-volatile memory that has nearly the same speed and latency of DRAM and has the non-volatility of NAND flash. The persistent memory 416 could dramatically increase system performance of the node 402 compared to the higher latency and slower speeds of the block-addressable storage 426 accessible to the node 402 through the storage file system 418 using the file system tier 424 (e.g., hard disk drives, solid state storage, cloud storage, etc.). The persistent memory 416 is byte-addressable, and may be accessed through a memory controller. This provides faster and more fine-grained access to persistent storage within the persistent memory 416 compared to block-based access to the block-addressable storage 426 through the storage file system 418.

The persistent memory file system 414 implemented for the byte-addressable persistent memory 416 is different than the storage file system 418 implemented for the block-addressable storage 426. For example, the persistent memory file system 414 may comprise data structures and/or functionality tailored to byte-addressable semantics of the persistent memory 416 for accessing bytes of storage, which are different than data structures and functionality of the storage file system 418 that are tailored to block-addressable semantics of the storage 426 for accessing blocks of storage. Furthermore, the persistent memory file system 414 is tailored for the relatively faster access speeds and lower latency of the persistent memory 416, which improves the operation of the node 402 by allowing the node 402 to process I/O from client devices much faster using the persistent memory tier 422, the persistent memory file system 414, and the persistent memory 416.

In order to integrate the persistent memory 416 into the node 402 in a manner that allows client data of client devices, such as the client device 428, to be stored into and read from the persistent memory 416, the persistent memory tier 422 is implemented within the storage operating system storage stack 420 for managing the persistent memory 416. The persistent memory tier 422 is maintained at a higher level within the storage operating system storage stack 420 than the file system tier 424 used to manage the storage file system 418. The persistent memory tier 422 is maintained higher in the storage operating system storage stack 420 than the file system tier 424 so that operations received from client devices by the node 402 are processed by the persistent memory tier 422 before the file system tier 424 even though the operations may target the storage file system 418 managed by the file system tier 424. This occurs because higher levels within the storage operation system storage stack 420 process operations before lower levels within the storage operating system storage stack 420.

The persistent memory tier 422 may implement various APIs, functionality, data structures, and commands for the persistent memory file system 414 to access and/or manage the persistent memory 416. For example, the persistent memory tier 422 may implement APIs to access the persistent memory file system 414 of the persistent memory 416 for storing data into and/or retrieving data from the persistent memory 416 according to byte-addressable semantics of the persistent memory 416. The persistent memory tier 422 may implement functionality to determine when data should be tiered out from the persistent memory 416 to the storage 426 based upon the data becoming infrequently accessed, and thus cold.

The persistent memory file system 414 is configured with data structures for tracking and locating data within the persistent memory 416 according to the byte-addressable semantics. For example, the persistent memory file system 414 indexes the persistent memory 416 of the node 402 as an array of pages (e.g., 4 kb pages) indexed by page block numbers. One of the pages, such as a page (1), comprises a file system superblock that is a root of a file system tree of the persistent memory file system 414. A duplicate copy of the file system superblock may be maintained within another page of the persistent memory 416 (e.g., a last page, a second to last page, a page that is a threshold number of indexed pages away from page (1), etc.). The file system superblock comprises a location of a list of file system info objects 404.

The list of file system info objects 404 comprises a linked list of pages, where each page contains a set of file system info objects. If there are more file system info objects than what can be stored within a page, then additional pages may be used to store the remaining file system info objects and each page will have a location of the next page of file system info objects. In this way, a plurality of file system info objects can be stored within a page of the persistent memory 416. Each file system info object defines a file system instance for a volume and snapshot (e.g., a first file system info object correspond to an active file system of the volume, a second file system info object may correspond to a first snapshot of the volume, a third file system info object may correspond to a second snapshot of the volume, etc.). Each file system info object comprises a location within the persistent memory 416 of an inofile (e.g., a root of a page tree of the inofile) comprising inodes of a file system instance.

An inofile 406 of the file system instance comprises an inode for each file within the file system instance. An inode of a file comprises metadata about the file. Each inode stores a location of a root of a file tree for a given file. In particular, the persistent memory file system 414 maintains file trees 408, where each file is represented by a file tree of indirect pages (intermediate nodes of the file tree) and direct blocks (leaf nodes of the file tree). The direct blocks are located in a bottom level of the file tree, and one or more levels of indirect pages are located above the bottom level of the file tree. The indirect pages of a particular level comprise references to blocks in a next level down within the file tree (e.g., a reference comprising a file block number of a next level down node or a reference comprising a per-page structure ID of a per-page structure having the file block number of the next level down node). Direct blocks are located at a lowest level in the file tree and comprise user data. Thus, a file tree for a file may be traversed by the persistent memory file system 414 using a byte range (e.g., a byte range specified by an I/O operation) mapped to a page index of a page (e.g., a 4 k offset) comprising the data within the file to be accessed.

The persistent memory file system 414 may maintain other data structures used to track and locate data within the persistent memory 416. In an embodiment, the persistent memory file system 414 maintains per-page structures 410. A per-page structure is used to track metadata about each page within the persistent memory 416. Each page will correspond to a single per-page structure that comprises metadata about the page. In an embodiment, the per-page structures are stored in an array within the persistent memory 416. The per-page structures correspond to file system superblock pages, file system info pages, indirect pages of the inofile 406, user data pages within the file trees 408, per-page structure array pages, etc.

In an embodiment of implementing per-page structure to page mappings using a one-to-one mapping, a per-page structure for a page can be fixed at a page block number offset within a per-page structure table. In an embodiment of implementing per-page structure to page mappings using a variable mapping, a per-page structure of a page stores a page block number of the page represented by the per-page structure. With the variable mapping, persistent memory objects (e.g., objects stored within the file system superblock to point to the list of file system info objects; objects within a file system info object to point to the root of the inofile; objects within an inode to point to a root of a file tree of a file; and objects within indirect pages to point to child blocks (child pages)) will store a per-page structure ID of its per-page structure as a location of a child page being pointed to, and will redirect through the per-page structure using the per-page structure ID to identify the physical block number of the child page being pointed to. Thus, an indirect entry of an indirect page will comprise a per-page structure ID that can be used to identify a per-page structure having a physical block number of the page child pointed to by the indirect page.

The persistent memory tier 422 may implement functionality to utilize a policy to determine whether certain operations should be redirected to the persistent memory file system 414 and the persistent memory 416 or to the storage file system 418 and the storage 426 (e.g., if a write operation targets a file that the policy predicts will be accessed again, such as accessed within a threshold timespan or accessed above a certain frequency, then the write operation will be retargeted to the persistent memory 416). For example, the node 402 may receive an operation from the client device 428.

The operation may be processed by the storage operating system using the storage operating system storage stack 420 from a highest level down through lower levels of the storage operating system storage stack 420. Because the persistent memory tier 422 is at a higher level within the storage operating system storage stack 420 than the file system tier 424, the operation is intercepted by the persistent memory tier 422 before reaching the file system tier 424. The operation is intercepted by the persistent memory tier 422 before reaching the file system tier 424 even though the operation may target the storage file system 418 managed by the file system tier 424. This is because the persistent memory tier 422 is higher in the storage operating system storage stack 420 than the file system tier 424, and operations are processed by higher levels before lower levels within the storage operating system storage stack 420.

Accordingly, the operation is intercepted by the persistent memory tier 422 within the storage operating system storage stack 420. The persistent memory tier 422 may determine whether the operation is to be retargeted to the persistent memory file system 414 and the persistent memory 416 or whether the operation is to be transmitted (e.g., released to lower tiers within the storage operating system storage stack 420) by the persistent memory tier 422 to the file system tier 424 for processing by the storage file system 418 utilizing the storage 426. In this way, the tiers within the storage operating system storage stack 420 are used to determine how to route and process operations utilizing the persistent memory 416 and/or the storage 426.

In an embodiment, an operation 401 is received by the node 402. The operation 401 may comprise a file identifier of a file to be accessed. The operation 401 may comprise file system instance information, such as a volume identifier of a volume to be accessed and/or a snapshot identifier of a snapshot of the volume to be accessed. If an active file system of the volume is to be accessed, then the snapshot identifier may be empty, null, missing, comprising a zero value, or otherwise comprising an indicator that no snapshot is to be accessed. The operation 401 may comprise a byte range of the file to be accessed.

The list of file system info objects 404 is evaluated using the file system information to identify a file system info object matching the file system instance information. That is, the file system info object may correspond to an instance of the volume (e.g., the active file system of the volume or a snapshot identified by the snapshot identifier of the volume identified by the volume identifier within the operation 401) being targeted by the operation 401, which is referred to as an instance of a file system or a file system instance. In an embodiment of the list of file system info objects 404, the list of file system info objects 404 is maintained as a linked list of entries. Each entry corresponds to a file system info object, and comprises a volume identifier and a snapshot identifier of the file system info object. In response to the list of file system info objects 404 not comprising any file system info objects that match the file system instance information, the operation 401 is routed to the file system tier 424 for execution by the storage file system 418 upon the block-addressable storage 426 because the file system instance is not tiered into the persistent memory 416. However, if the file system info object matching the file system instance information is found, then the file system info object is evaluated to identify an inofile such as the inofile 406 as comprising inodes representing files of the file system instance targeted by the operation 401.

The inofile 406 is traversed to identify an inode matching the file identifier specified by the operation 401. The inofile 406 may be represented as a page tree having levels of indirect pages (intermediate nodes of the page tree) pointing to blocks within lower levels (e.g., a root points to level 2 indirect pages, the level 2 indirect pages point to level 1 indirect pages, and the level 1 indirect pages point to level 0 direct blocks). The page tree has a bottom level (level 0) of direct blocks (leaf nodes of the page tree) corresponding to the inodes of the file. In this way, the indirect pages within the inofile 406 are traversed down until a direct block corresponding to an inode having the file identifier of the file targeted by the operation 401 is located.

The inode may be utilized by the persistent memory file system 414 to facilitate execution of the operation 401 by the persistent memory tier 422 upon the persistent memory 416 in response to the inode comprising an indicator (e.g., a flag, a bit, etc.) specifying that the file is tiered into the persistent memory 416 of the node 402. If the indicator specifies that the file is not tiered into the persistent memory 416 of the node 402, then the operation 401 is routed to the file system tier 424 for execution by the storage file system 418 upon the block-addressable storage 426.

In an embodiment where the operation 401 is a read operation and the inode comprises an indicator that the file is tiered into the persistent memory 416, the inode is evaluated to identify a pointer to a file tree of the file. The file tree may comprise indirect pages (intermediate nodes of the file tree comprising references to lower nodes within the file tree) and direct blocks (leaf nodes of the file tree comprising user data of the file). The file tree may be traversed down through levels of the indirect pages to a bottom level of direct blocks in order to locate one or more direct blocks corresponding to pages within the persistent memory 416 comprising data to be read by the read operation (e.g., a direct block corresponding to the byte range specified by the operation 401). That is, the file tree may be traversed to identify data within one or more pages of the persistent memory 416 targeted by the read operation. The traversal utilizes the byte range specified by the read operation. The byte range is mapped to a page index of a page (e.g., a 4 kb offset) of the data within the file to be accessed by the read operation. In an embodiment, the file tree is traversed to determine whether the byte range is present within the persistent memory 416. If the byte range is present, then the read operation is executed upon the byte range. If the byte range is not present, then the read operation is routed to the file system tier 424 for execution by the storage file system 418 upon the block-based storage 426 because the byte range to be read is not stored within the persistent memory 416.

In an embodiment where the operation 401 is a write operation, access pattern history of the file (e.g., how frequently and recently the file has been accessed) is evaluated in order to determine whether the execute the write operation upon the persistent memory 416 or to route the write operation to the file system tier 424 for execution by the storage file system 418 upon the block-addressable storage 426. In this way, operations are selectively redirected by the persistent memory tier 422 to the persistent memory file system 414 for execution upon the byte-addressable persistent memory 416 or routed to the file system tier 424 for execution by the storage file system 418 upon the block-addressable storage 426 based upon the access pattern history (e.g., write operations targeting more frequently or recently accessed data/files may be executed against the persistent memory 416).

Primary reference counts, such as a hierarchy of primary reference counts where child pages inherit reference counts of parent pages, may be maintained for pages within the persistent memory file system 414. A primary reference count of a page within the persistent memory file system 414 indicates how many times data within the page is referenced by an active file system and/or one or more snapshots and/or one or more file clones. If the reference count becomes incorrect, such as due to a failure occurring while the reference count is being updated, then the reference count may be too large or too small (a value different than a correct reference count value). If the reference count is too large (a value that is higher than a correct reference count value), then memory leaks can occur where the page is retained within persistent memory even though nothing is using/referencing the data within the page. If the reference count is too small (a value that is lower than a correct reference count value), then data corruption can occur where the page is freed and reused to store different data even though the data that was freed is still being used/referenced.

Determining the correct reference counts for the pages after the failure may be difficult or impossible after the failure due to how the persistent memory 416 can persist operations in any order and does not guarantee/control the order with which the operations are persisted. Thus, it may be impossible to determine whether an in-progress update to a reference count during the failure was updated or not. Accordingly, as described in further detail in relation to the exemplary method 500 of FIG. 5 and system 600 of FIGS. 6A-6H, reference counts are maintained in a manner where correct values of the reference counts can be recomputed after the node 402 recovers from a failure.

Figure 5:
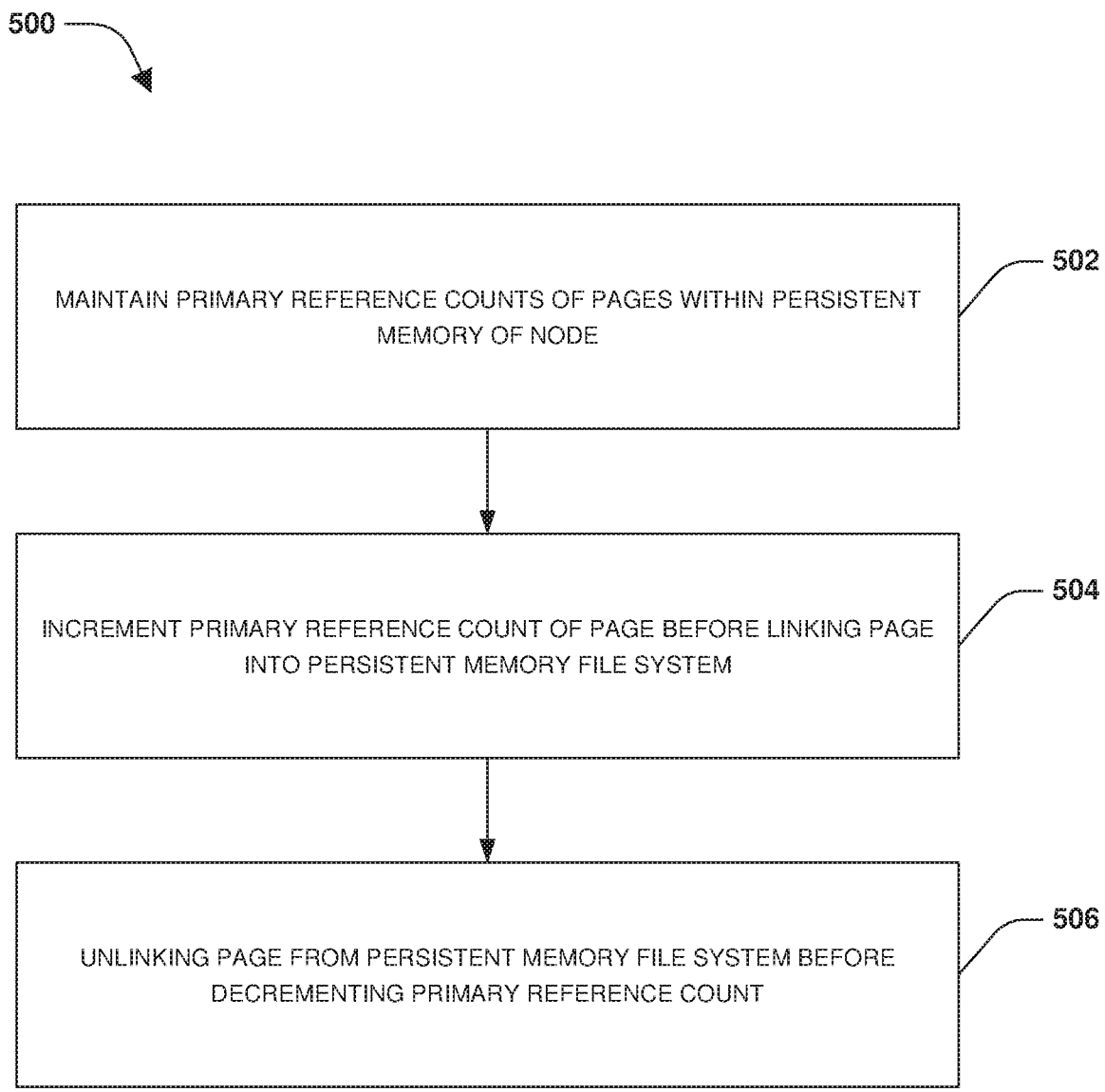
FIG. 5 is a flow chart illustrating an example of a set of operations for maintaining and recomputing reference counts in a persistent memory file system in accordance with an embodiment of the invention.

One embodiment of maintaining reference counts in a persistent memory file system 604 is illustrated by an exemplary method 500 of FIG. 5 and further described in conjunction with system 600 of FIGS. 6A-6H. In an embodiment, the node 602 may corresponding to the node 402 of FIG. 4, such as where the node 602 comprises the storage operating system storage stack 420 within which the persistent memory tier 422 is implemented, the storage file system 418 used to store and access data within the storage 426, and the persistent memory file system 414 (persistent memory file system 604) used to store and access data within the persistent memory 416 (persistent memory 606).

The persistent memory file system 604 may be used to store and organize files, directories, and/or other data within pages of the persistent memory 606 of the node 602. When operations are executed upon the persistent memory 606, such as to write to a page, update a primary reference count of a page, etc., the order that the persistent memory 606 persists the operations is not guaranteed or controlled. For example, if a set of operations to add a page into the persistent memory 606 (e.g., link the page into the persistent memory file system 604) and to increment a reference count for the page is transmitted to the persistent memory 606, then there is no guarantee of the order with which the architecture of the persistent memory 606 will persistent such operations.

This can cause issues when the node 602 experiences a failure while the set of operations are pending with the persistent memory 606 because there is no way to tell which operations successfully persisted and which operations did not successfully persist. Without knowing whether the primary reference count for the page was updated or not, a current value of the reference count after the node 602 recovers from the failure could be incorrect such as where only the page was added to the persistent memory 606 and the primary reference count was never updated. Incorrect reference counts can cause memory leaks due to reference counts being higher than the correct value and/or data corruption due to reference counts being lower than the correct value. Accordingly, as provided herein, reference counts are maintained and updated in a manner that allows for the correct values of the reference counts to be determined after the node 602 recovers from a failure.

During operation 502 of method 500 of FIG. 5, primary reference counts for pages within the persistent memory 606 of the node 602 are maintained. A primary reference count for a page may comprise a value indicating a number of times data stored within the page is referenced by an active file system, a snapshot of the active file system, etc. If the primary reference count is zero, then the data of the page is no longer referenced and the page can be freed to store other data. In an embodiment, the primary reference counts are maintained as hierarchical reference counts where a child page of a parent page will inherit the reference count of the parent page.

In order to maintain reference counts in a manner where the reference counts can be accurately determined after a failure of the node 602, certain rules and procedures are enforced for how to order certain operations with respect to one another. For example, the rules and procedures are used to enforce an ordering of certain operations such that if the node 602 has a failure, then the primary reference counts will either be the correct value or larger than the correct value, but not smaller than the correct value after the node 602 recovers.

In an embodiment, a first rule is implemented to specify that primary reference counts are to be incremented before pages are linked into the persistent memory file system 604. Accordingly, during operation 504 of method 500 of FIG. 5, in response to receiving a first operation to link a page into the persistent memory file system 604 of the persistent memory 606, a primary reference count of the page is increment before the page is linked into the persistent memory file system 604. For example, the page is linked into the persistent memory file system 604 only after the primary reference count has been successfully incremented. Thus, if the node 602 experiences a failure during the first operation, the primary reference count will either be correct (e.g., the incrementing of the primary reference count and the linking of the page both fail or both succeed) or too large (e.g., the incrementing of the primary reference count succeeds but the linking of the page fails) because the first rule avoids a situation where the page is successfully linked but the primary reference count is never incremented.

In an embodiment, a second rule is implemented to specify that primary reference counts are to be decremented after pages are unlinked from the persistent memory file system 604. Accordingly, during operation 506 of method 500 of FIG. 5, in response to receiving a second operation to unlink the page from the persistent memory file system 604 of the persistent memory 606, the primary reference count of the page is increment after the page is unlinked from the persistent memory file system 604. For example, the primary reference count is only decremented once the page has been successfully unlinked from the persistent memory file system 604. Thus, if the node 602 experiences a failure during the second operation, the primary reference count will either be correct (e.g., the decrementing of the primary reference count and the unlinking of the page both fail or both succeed) or too large (e.g., the unlinking of the page succeeds but the decrementing of the primary reference count fails) because the second rule avoids a situation where the page is never unlinked but the primary reference count is successfully decremented.

Figure 6A:
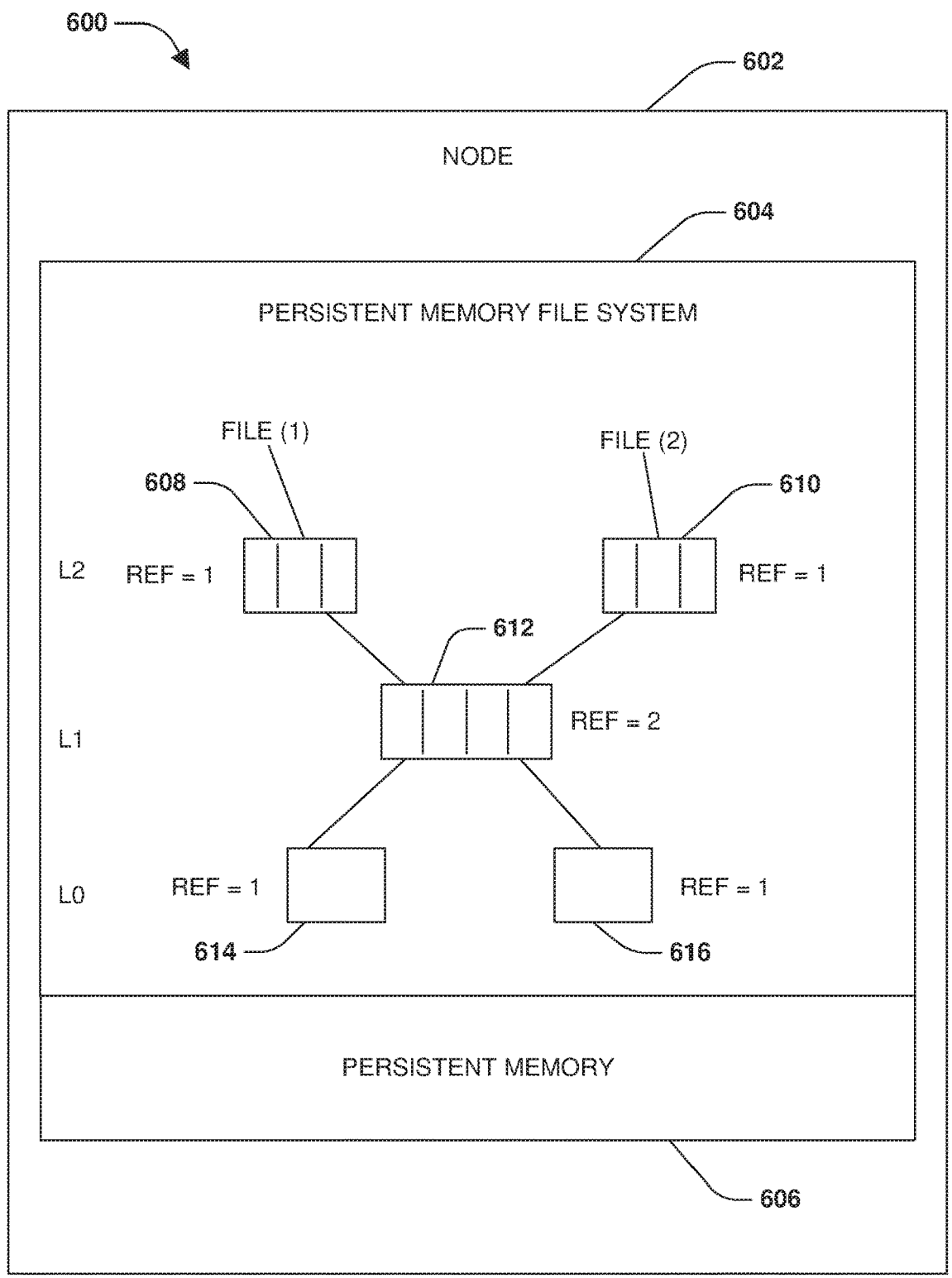
FIG. 6A is a block diagram illustrating an example of a node that can maintain and recompute reference counts in a persistent memory file system in accordance with an embodiment of the invention.
Figure 6B:
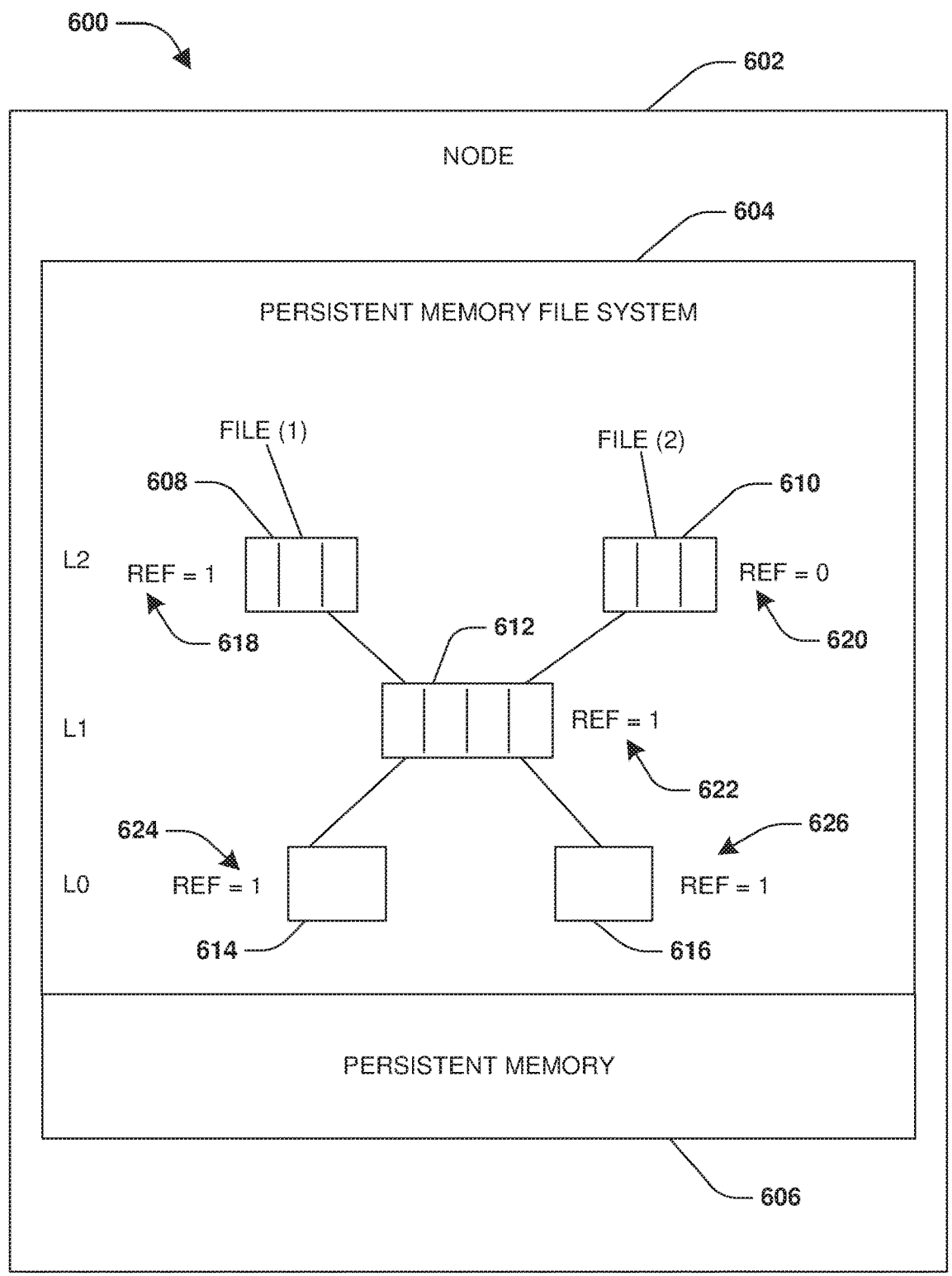
FIG. 6B is a block diagram illustrating an example of a node that can maintain and recompute reference counts in a persistent memory file system, where a scanner has traversed the persistent memory file system through a file in accordance with an embodiment of the invention.
Figure 6C:
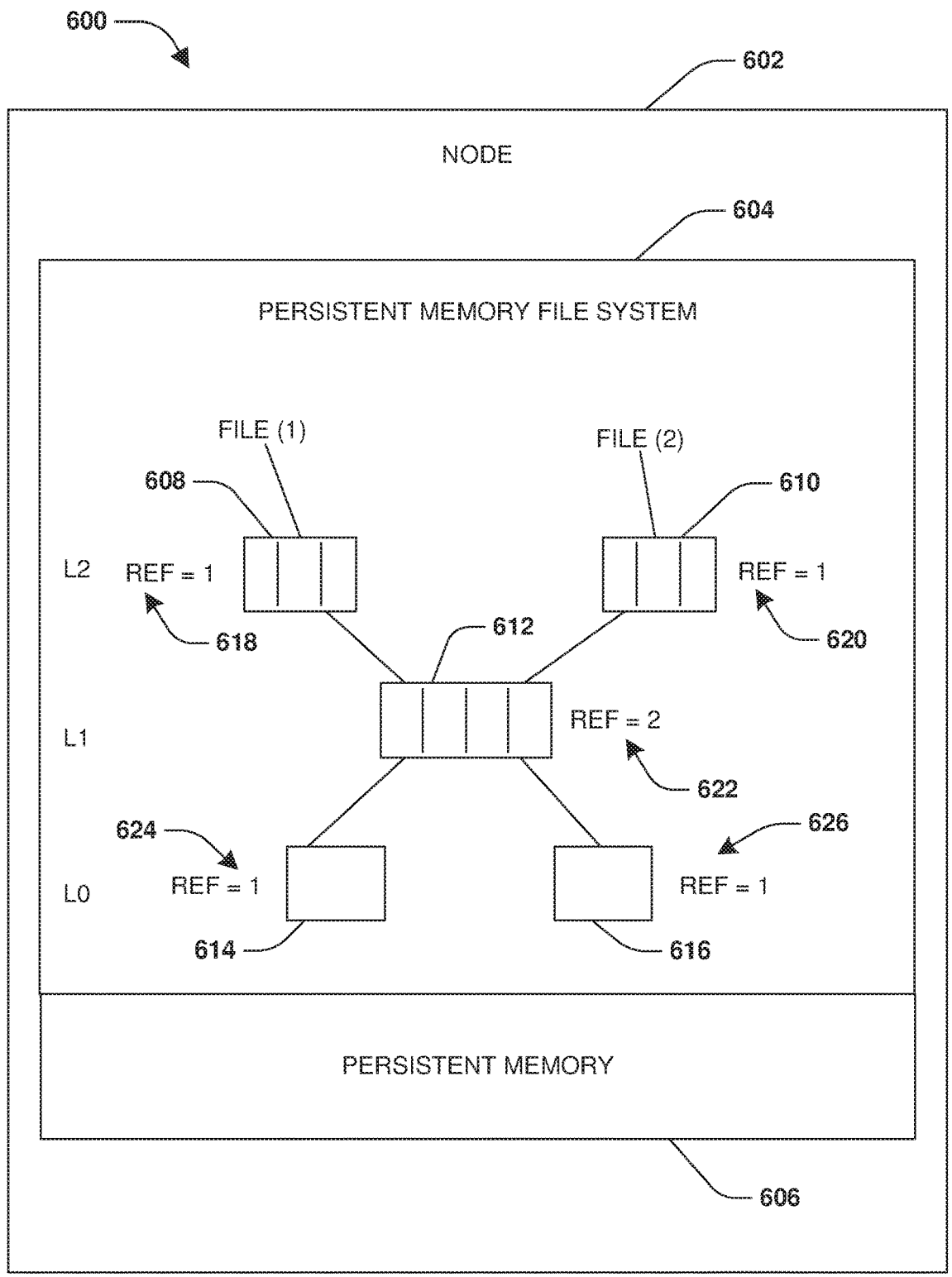
FIG. 6C is a block diagram illustrating an example system of a node for maintaining and recomputing reference counts in a persistent memory file system, where a scanner has traversed the persistent memory file system through a file in accordance with an embodiment of the invention.
Figure 6D:
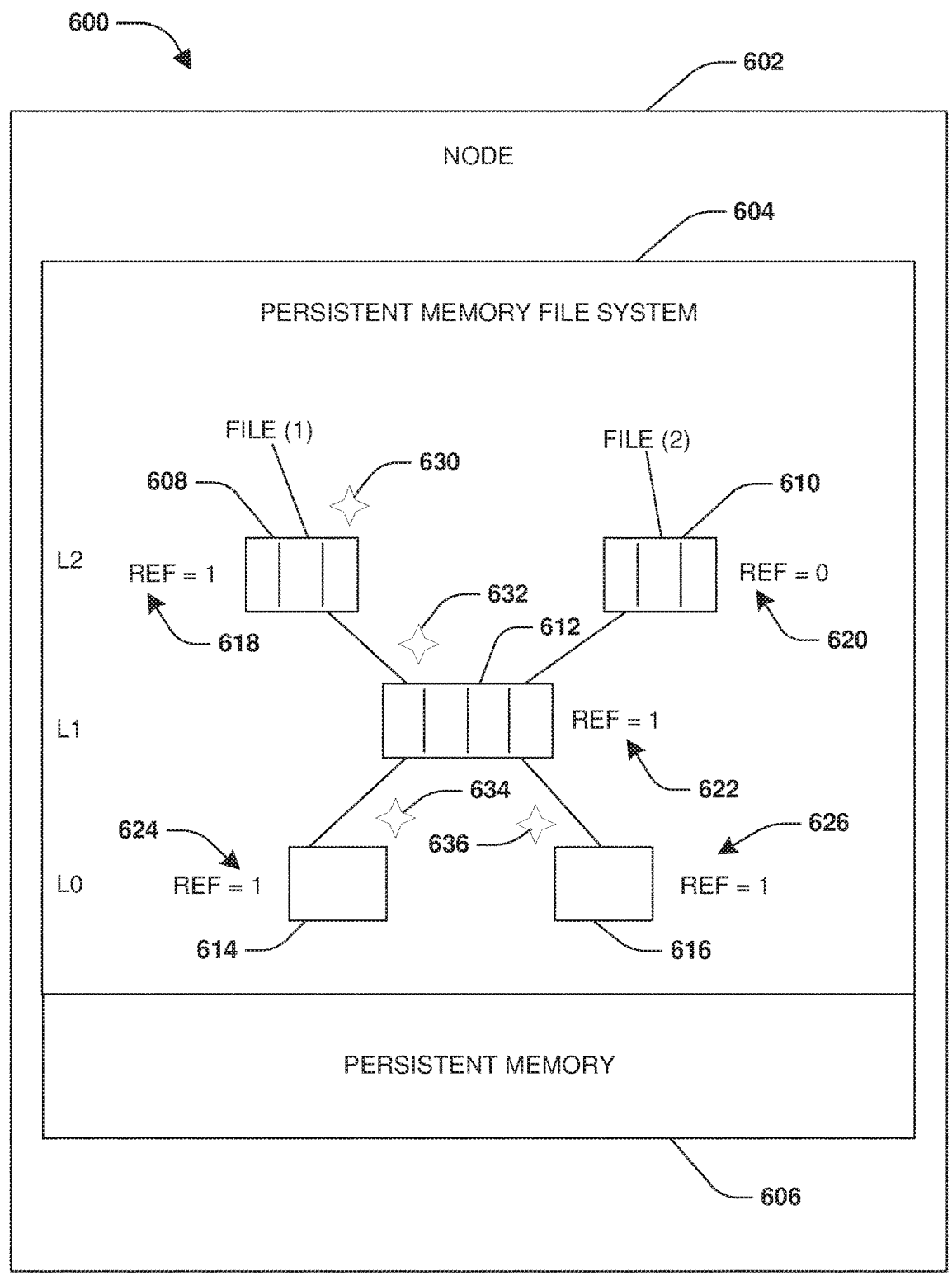
FIG. 6D is a block diagram illustrating an example of a node for maintaining and recomputing reference counts in a persistent memory file system, where visited fields are maintained for pages within the persistent memory file system in accordance with an embodiment of the invention.
Figure 6E:
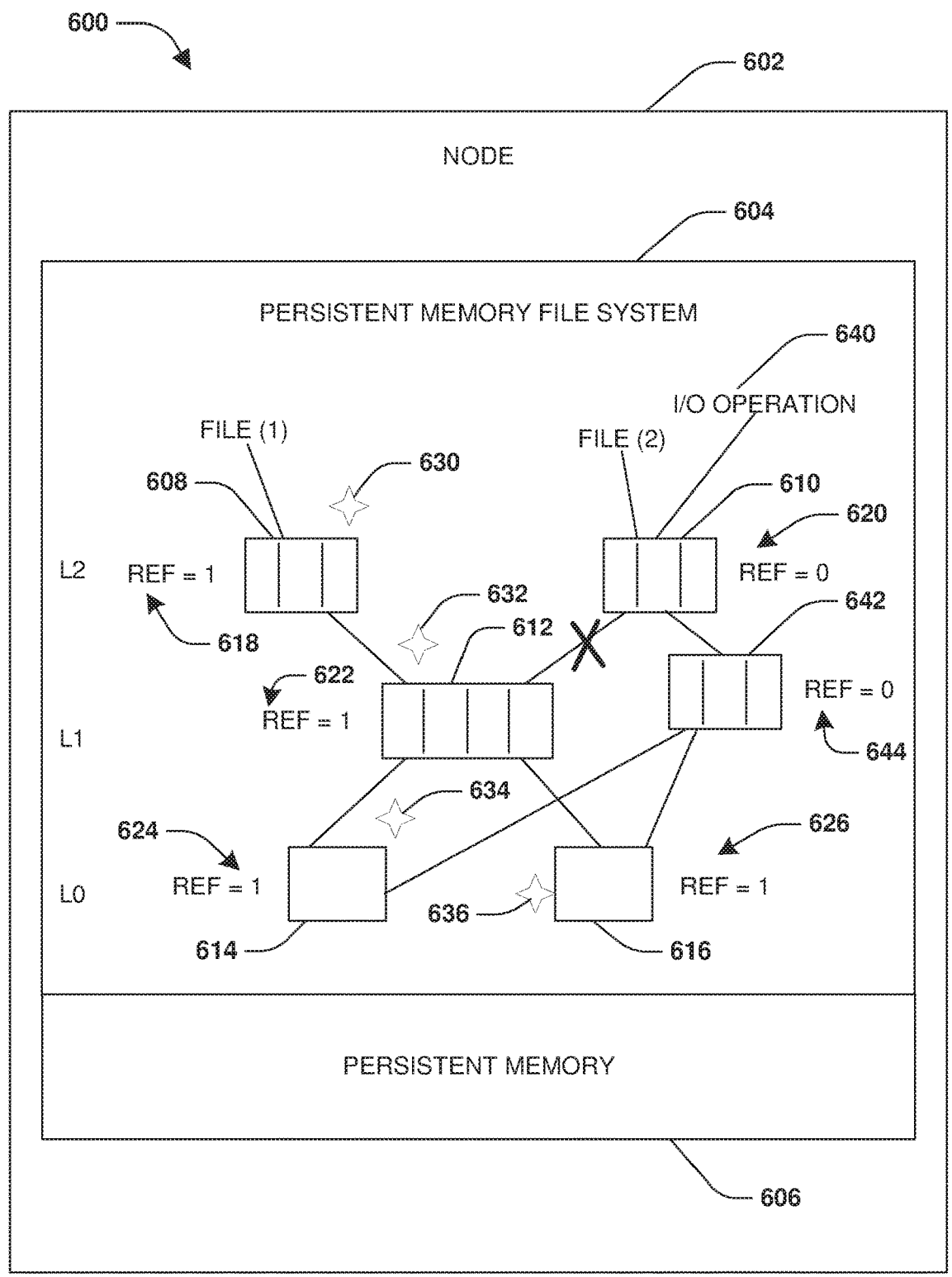
FIG. 6E is a block diagram illustrating an example of a node for maintaining and recomputing reference counts in a persistent memory file system, where an I/O operation is processed while a scanner is traversing the persistent memory file system in accordance with an embodiment of the invention.
Figure 6F:
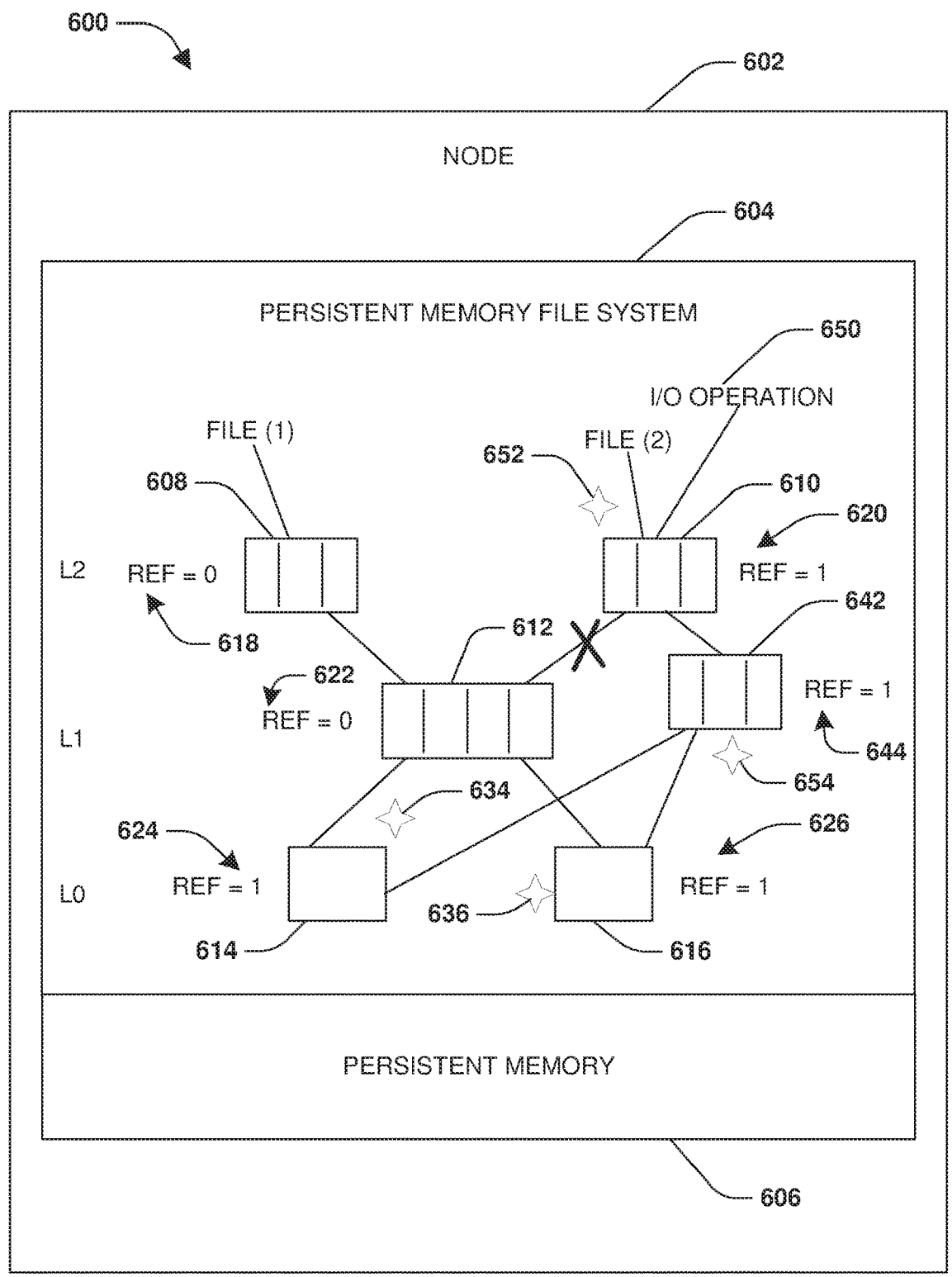
FIG. 6F is a block diagram illustrating an example of a node for maintaining and recomputing reference counts in a persistent memory file system, where an I/O operation is processed while a scanner is traversing the persistent memory file system in accordance with an embodiment of the invention.
Figure 6G:
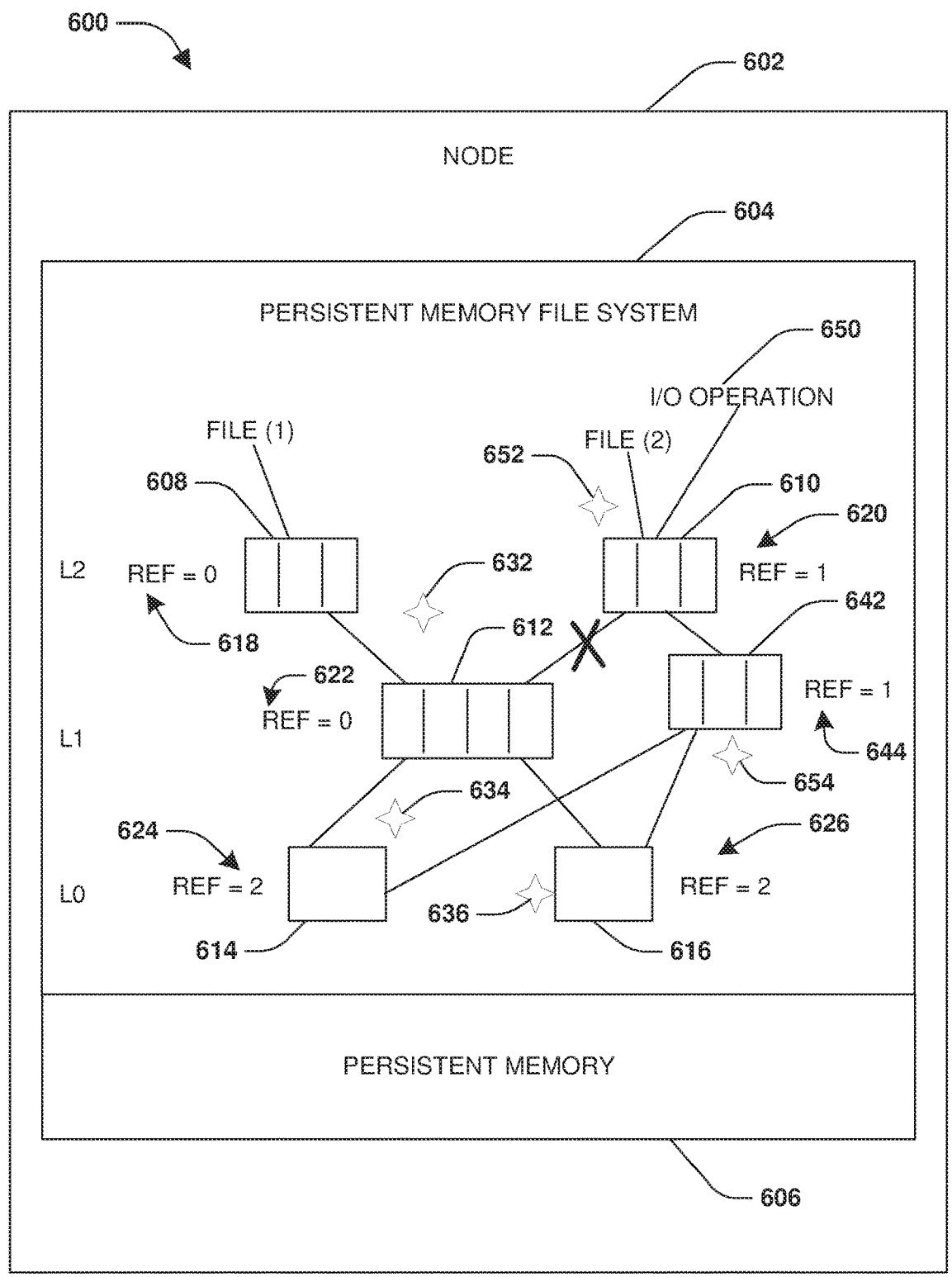
FIG. 6G is a block diagram illustrating an example of a node that can maintain and recompute reference counts in a persistent memory file system, where an I/O operation is processed while a scanner is traversing the persistent memory file system in accordance with an embodiment of the invention.
Figure 6H:
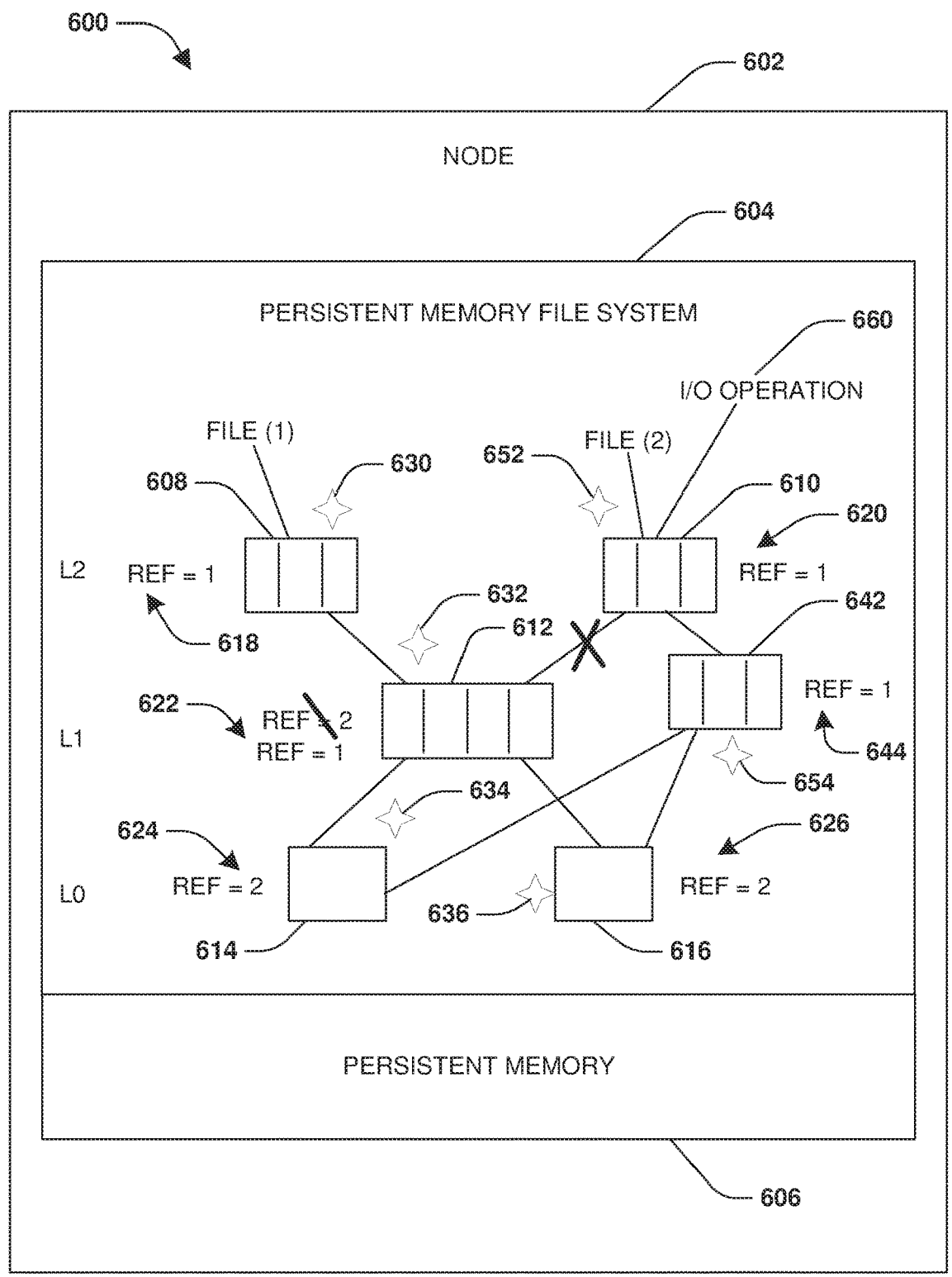
FIG. 6H is a block diagram illustrating an example system for maintaining and recomputing reference counts in a persistent memory file system, where an I/O operation is processed while a scanner is traversing the persistent memory file system in accordance with an embodiment of the invention.
Figure 7:
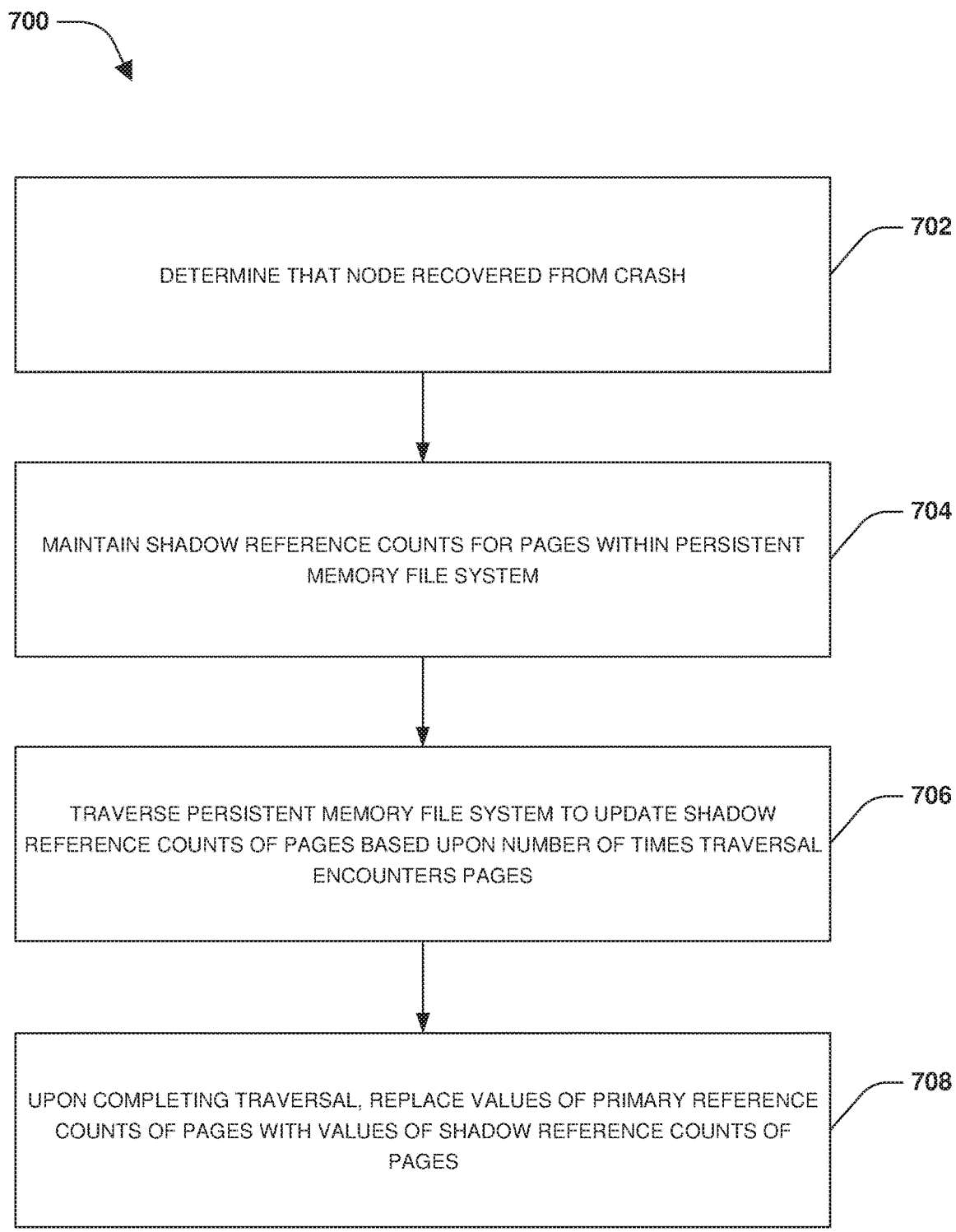
FIG. 7 is a flow chart illustrating an example of a set of operations for traversing a persistent memory file system for recomputing reference counts in accordance with an embodiment of the invention.

One embodiment of recomputing reference counts in the persistent memory file system 604 is illustrated by an exemplary method 700 of FIG. 7 and further described in conjunction with system 600 of FIGS. 6A-6H.

The node 602 may experience a failure that could result in reference counts that are not accurate after the node recovers from the failure, such as where an operation that modifies one or more primary reference counts is pending with the persistent memory 606 during the failure. Because the primary reference counts will either have the correct values or values larger than the correct values, the correct values for the primary reference counts can be determined after the node 602 recovers and/or while the node 602 resumes processing client I/O.

During operation 702 of method 700 of FIG. 7, a determination is made that the node 602 has recovered from the failure. Accordingly, a scanner is implemented to traverse (walk) the persistent memory file system 604 in response to the node 602 recovering from the failure. During operation 704 of method 700 of FIG. 7, shadow reference counts are maintained by the scanner for the pages within the persistent memory file system 604. The scanner will traverse the persistent memory file system 604 to determine a number of times each page is encountered (seen) by the scanner, during operation 706 of the method 700 of FIG. 7. Each time a page is encountered, shadow reference counts of certain pages will be incremented. For example, in some embodiments, a primary reference count and a shadow reference count are maintained for each page. A primary reference count is utilized by the persistent memory file system 604 of the node 602 as an official reference count for a page. A shadow reference count for the page is utilized and modified by the scanner during the traversal in order to determine/calculate correct reference counts of pages within the persistent memory file system 604.

The scanner does not modify primary reference counts during the traversal. Thus, if the scanner encounters an error before completion, the error does not affect the primary reference counts which could otherwise lead to an inability to determine the correct value of the primary reference counts. Instead, the scanner can merely be restarted to traverse the persistent memory file system 604 after the scanner recovers from the error. In this way, primary reference counts and shadow reference counts are maintained for the pages within the persistent memory file system 604, and the scanner traverses the persistent memory file system 604 in order to update shadow reference counts associated with pages encountered by the scanner during the traversal. Accordingly, once the traversal of the persistent memory file system 604 is finished, a shadow reference count for page may correspond to a number of times the page is encountered during the traversal of the persistent memory file system 604, which corresponds to a correct value of a reference count for the page. In response to the scanner completing the traversal, values within the primary reference counts are replaced with the correct values within the shadow reference counts (correct reference count values), during operation 708 of the method 700 of FIG. 7. Any page with a zero primary reference count may be freed for use in storing other data because data within that page is no longer referenced/used.

In an embodiment of the traversal of the persistent memory file system 604 during the operation 706 of the method 700 of FIG. 7, in response to encountering a page during the traversal, shadow reference counts of child pages that are children of the page are incremented if there are child pages of the page (e.g., L0 pages such as level 0 leaf pages within the persistent memory file system 604 have no children but comprise actual user data; a page may be an indirect page with no children due to a state of a persistent memory tier; etc.). When the traversal encounters a current page, shadow reference counts of child pages of the current page are modified, but not a shadow reference count of the current page. Once the shadow reference counts of the child pages are incremented, a visited field for the page is set to indicate that the traversal encountered the page. If the page has no child pages, then the visited field for the page is set to indicate that the traversal encountered the page. If the visited field for the page is already set to indicate that the traversal has encountered the page, then recursion down the persistent memory file system 604 (e.g., traversal down a current branch of pages within the persistent memory file system 604) is terminated.

In an embodiment, the node 602 may be processing client I/O during the traversal so that there is little to no latency and downtime due to otherwise waiting for the traversal and reference count re-computation to complete. Accordingly, visited fields of pages are used as an indicator for how to process client I/O targeting the pages based upon whether the pages have been traversed yet or not by the scanner. In particular, when an operation targets a page, a visited field of a parent page of the page is evaluated to determine how to process the operation, such as to determine whether processing of the operation should modify any shadow reference counts or refrain from modifying shadow reference counts. In an embodiment, there are two L2 pages (level 2 intermediate pages within the persistent memory file system 604) pointing to an L1 page (a level 1 intermediate page within the persistent memory file system 604, which may point to one or more L0 pages that are leaf pages comprising user data). An operation is to write to the L1 page, which may be implemented as a copy-on-write where the L1 page is served from a parent page, and is then copied as a new L1 page (a copied L1 page) with the new data being written by the operation so that the original L1 page retains the original data and the new L1 page comprises the new data.

Accordingly, a visited field of the L2 page (a parent page with respect to the new L1 page that is a child page of the L2 page) through which the operation is traversing to reach the L1 page for writing to the L1 page is evaluated to see if the L2 page has already been visited by the traversal by the scanner. If the visited field of the L2 page (parent page) indicates that the scanner has visited the L2 page, then a primary reference count and a shadow reference count for the L1 page are decremented, a primary and a shadow reference count of the new L1 page is set to 1, the primary and shadow reference counts of children of the new L1 page are incremented, and a visited field for the new L1 page is marked to indicate that the new L1 page has been visited. If the visited field of the L2 page (parent page) indicates that the scanner has not visited the L2 page, then the primary reference count of the L1 page is decremented, primary reference counts of children of the new L1 page are incremented, no shadow reference counts are updated, the shadow reference count of the new L1 page remains set to 0, and a visited field for the new L1 page is marked to indicated that the new L1 page has not been visited.

In an embodiment of processing the client I/O during the traversal, an operation may be received that targets a page. Accordingly, a primary reference count of the page is modified and shadow reference counts associated with the page and children of the page are not modified based upon a visited field for a parent page of the page being set to indicate that the traversal has not encountered the page. In an embodiment of processing the client I/O during the traversal, an operation may be received that targets a page. Accordingly, shadow reference counts for child pages that are children of the page are modified based upon a visited field for a parent page of the page being set to indicate that the traversal has encountered the page. In an embodiment of processing the client I/O during the traversal, an operation may be received that targets a page. Accordingly, a shadow reference of a copy of the page created by the operation is incremented (e.g., where the operation is implemented as a copy-on-write operation that copes an original page as a copied page within which data of the operation is written instead of being written to the original page). In an embodiment of processing the client I/O during the traversal, an operation may be received that targets a page, where the operation is to create a new reference to the page. Accordingly, a shadow reference count of the page is incremented.

In an embodiment of processing the client I/O during the traversal, an operation may be received that targets a page, where the operation is to create a copy of the page as a copied page. Accordingly, a visited flag for the copied page is set to inherit a visited flag of a parent page that is a parent of the copied page. In an embodiment of processing the client I/O, during the traversal an operation may be received that targets a page, where the operation is to create a copy of the page as a copied page. Accordingly, a shadow reference count for the copied page is set to a first value based upon a visited field of a parent page indicating that the parent page was encountered by the traversal by the scanner. The shadow reference count for the copied page is set to a second value based upon the visited field indicating that the parent page has not been encountered by the traversal. In an embodiment, if the copied page has an inherited visited flag indicating that the parent page of the copied page was encountered by the traversal, then primary reference counts and shadow reference counts of child pages that are children of the copied page are incremented.

In an embodiment of an operation being processed as a copy-on-write operation that copies as a page (an original page) as a copied page (a new page), the copied page will inherit a visited field of a parent page of the page. If the parent page was already traversed by the scanner, then the copied page's shadow reference count is set to 1, and shadow reference count of the page is decremented. If the parent page has not yet been traversed, then the copied page's shadow reference count is set to 0 and the shadow reference count of the page is not modified. If the copied page has an inherited visited field set to true to indicate traversal has already been performed and the shadow reference count of the page is greater than 0 after being decremented, then shadow reference counts of child pages of the copied page are incremented.

FIGS. 6A-6G illustrate an example of recomputing reference counts of pages within the persistent memory file system 604 during the operation 706 of the method 700 of FIG. 7. In this simplified example, the persistent memory file system 604 comprises a first page 608 and a second page 610 that are L2 pages (e.g., level 2 intermediate pages within the persistent memory file system 604 that point to a third page 612 as a child page), the third page 612 that is an L1 page (e.g., a level 1 intermediate page within the persistent memory file system 604 that point to a fourth page 614 and a fifth page 616 as child pages), and the fourth page 614 and the fifth page 616 that are L0 pages (e.g., level 0 leaf pages comprising user data). It may be appreciated that the persistent memory file system 604 may comprise any number of levels and pages. FIG. 6 illustrates a correct state of reference counts for the pages, such as where the first page 608 has a reference count of 1, the second page 610 has a reference count of 1, the third page 612 has a reference count of 2, the fourth page 624 has a reference count of 1, and the fifth page 616 has a reference count of 1.

In an embodiment, there is an incoming operation that is to modify the third page 612 that is shared as a child page of the first page 608 associated with a file (1) and the second page 610 associated with a file (2) as parent pages. The incoming operation may be implemented as a copy-on-write operation that copies that content of the third page 612 as a copied third page 642 that will also point to the same child pages that are the fourth page 614 and the fifth page 616, and a parent page (the second page 610) will now point to the copied third page 642, as will be further explained and illustrated in relation to FIGS. 6E-6G.

FIG. 6B illustrates an intermediary state of the scanner traversing the persistent memory file system 604 to update shadow reference counts associated with traversing through the file (1), such as a first shadow reference count 618 of 1 for the first page 608, a second shadow reference count 620 of 0 for the second page 610, a third shadow reference count 622 of 1 for the third page 612, a fourth shadow reference count 624 of 1 for the fourth page 614, and a fifth shadow reference count 626 of 1 for the fifth page 616. This intermediary state reflects the scanner updating shadow reference counts of pages traversed through the file (1), such as the shadow reference counts of the first page 608, the third page 612, the fourth page 614, and the fifth page 616.

FIG. 6C illustrates a state of the scanner traversing the persistent memory file system 604 to update shadow reference counts associated with traversing through the file (2), such as the second shadow reference count 620 of 1 for the second page 610 and a the third shadow reference count 622 of 2 for the third page 612. The recursion down through the persistent memory file system 604 through the file (2) stops at the third page 612 because the scanner has already traversed (seen) the third page 612 when the scanner previously traversed down through the file (1).

FIG. 6D illustrates a state of the scanner traversing the persistent memory file system 604 to update shadow reference counts associated with traversing through the file (1), which is similar to the state illustrated by FIG. 6B. In addition to depicting a state similar to the state illustrated by FIG. 6B, FIG. 6D also illustrates visited fields associated with the traversal through the file (1). For example, a visited field 630 for the first page 608 is set to indicate that the traversal has traversed the first page 608. A visited field 632 for the third page 612 is set to indicate that the traversal has traversed the third page 612. A visited field 634 for the fourth page 614 is set to indicate that the traversal has traversed the fourth page 614. A visited field 636 for the fifth page 616 is set to indicate that the traversal has traversed the fifth page 616. At this state of the scanner traversing the persistent memory file system 604, the scanner has yet to traverse the persistent memory file system 604 through the file (2), and thus a visited field has not been set for the second page 610.

FIG. 6E illustrates an I/O operation 640 being received while the traversal of the scanner is at the state depicted by FIG. 6D. The I/O operation 640 may be processed through the second page 610 (e.g., an L2 indirect page associated with the file (2)) that has not yet been traversed by the scanner. The I/O operation 640 may be implemented as a copy-on-write operation directed to the third page 612. Accordingly, the third page 612 is copied to create a copied third page 642. The third page 612 is severed from the second page 610 (e.g., the second page 610 no longer points to the third page 612), and the second page 610 now points to the copied third page 642. The copied third page 642 will point to the same children as the third page 612, which are the fourth page 614 and the fifth page 616. Because the second page 610, as the parent of the copied third page 642, has not yet been traversed by the scanner, the copied third page 642 is set as not being visited and a shadow reference count for the copied third page 642 is set to 0. Because the second page 610 has not yet been traversed by the scanner, the third page 612 is not updated, and the fourth page 614 and the firth page 616 as children pages are not updated.

FIG. 6F illustrates an I/O operation 650 being received while the traversal of the scanner has already traversed the second page 610, as indicated by a visited field 652 for the second page 610 being set. The I/O operation 650 may be processed through the second page 610 (e.g., an L2 indirect page an L2 indirect page associated with the file (2)) that has already been traversed by the scanner. The I/O operation 650 may be implemented as a copy-on-write operation directed to the third page 612.

Accordingly, the third page 612 is copied to create a copied third page 642. The third page 612 is severed from the second page 610 (e.g., the second page 610 no longer points to the third page 612), and the second page 610 now points to the copied third page 642. The copied third page 642 will point to the same children as the third page 612, which are the fourth page 614 and the fifth page 616. Because the second page 610, as the parent of the copied third page 642, has already been traversed by the scanner, the copied third page 642 is marked as being visited using a visited field 654 and a shadow reference count 644 is set to 1. The third shadow reference count 622 for the third page 612 is decremented because the visited field 652 for the second page 610 indicates that the second page 610 has already been traversed by the scanner.

In an embodiment, because the third shadow reference count 622 is now 0, shadow reference counts of the fourth page 614 and the fifth page 616, as children pages, are not modified and the third visited field 632 is cleared from the third page 612. In another embodiment, because the I/O operation 650 targets the third page 612 that is an L1 page and the second page 610 has been traversed, then the shadow reference count of the copied third page 642 is set to 1, the shadow reference counts of the fourth page 614 and the fifth page 616 that are children pages are incremented, and the third visited field 632 is not cleared from the third page 612. In another embodiment where the third visited field 632 is set for the third page 612, the shadow reference counts of L0 pages (the fourth page 614 and the fifth page 616) are set to 2, as illustrated in FIG. 6G.

FIG. 6H illustrates an I/O operation 660 being received while the traversal of the scanner has already traversed the first page 608 and the second page 610. The third shadow reference count 622 of the third page 612 is initially set to 2. The I/O operation 660 may be processed through the second page 610 (e.g., an L2 indirect page associated with the file (2)) that has already been traversed by the scanner. The I/O operation 650 may be implemented as a copy-on-write operation directed to the third page 612.

Accordingly, the third page 612 is copied to create a copied third page 642. The third page 612 is severed from the second page 610 (e.g., the second page 610 no longer points to the third page 612), and the second page 610 now points to the copied third page 642. The copied third page 642 will point to the same children as the third page 612, which are the fourth page 614 and the fifth page 616. Because the second page 610, as the parent of the copied third page 642, has already been traversed by the scanner, the copied third page 642 is marked as being visited using a visited field 654 and a shadow reference count 644 is set to 1. The third shadow reference count 622 for the third page 612 is decremented from 2 to 1 because the visited field 652 for the second page 610 (a parent page to the third page 612) indicates that the second page 610 has already been traversed by the scanner. Because the third shadow reference count 622 has been decremented to 1, the fourth shadow reference count 624 for the fourth page 614 and the fifth shadow reference count 626 for the fifth page 616 are incremented from 1 to 2. In this way, shadow reference counts may be modified during the processing of client I/O by the node 602 while the scanner is traversing the persistent memory file system 604 without affecting the accuracy of the scanner determining correct reference counts for pages within the persistent memory file system 604.

Figure 8:
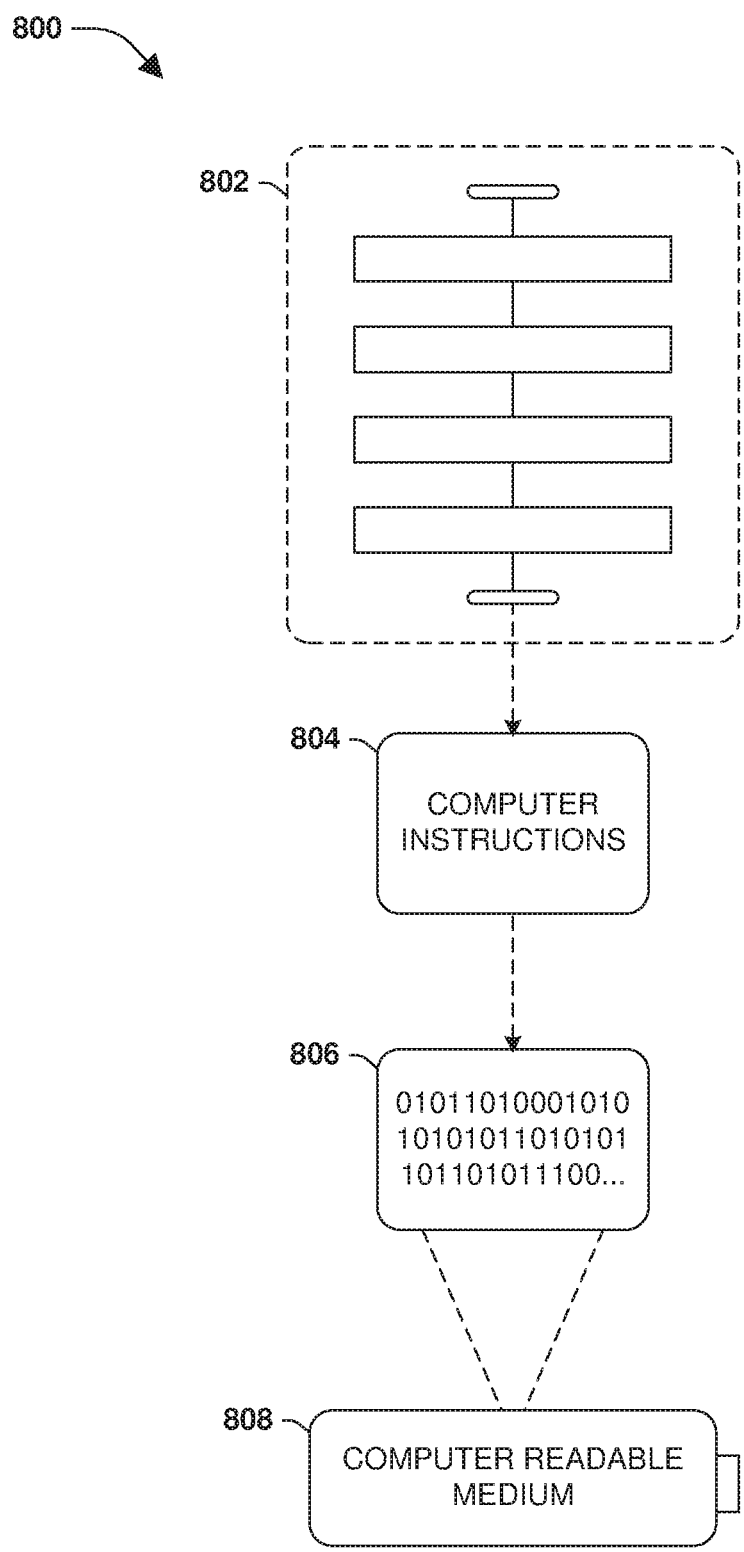
FIG. 8 is an example of a computer readable medium in which an embodiment of the invention may be implemented.

Still another embodiment involves a computer-readable medium 800 comprising processor-executable instructions configured to implement one or more of the techniques presented herein. An example embodiment of a computer-readable medium or a computer-readable device that is devised in these ways is illustrated in FIG. 8, wherein the implementation comprises a computer-readable medium 808, such as a compact disc-recordable (CD-R), a digital versatile disc-recordable (DVD-R), flash drive, a platter of a hard disk drive, etc., on which is encoded computer-readable data 806. This computer-readable data 806, such as binary data comprising at least one of a zero or a one, in turn comprises processor-executable computer instructions 804 configured to operate according to one or more of the principles set forth herein. In some embodiments, the processor-executable computer instructions 804 are configured to perform a method 802, such as at least some of the exemplary method 500 of FIG. 5 and/or at least some of the exemplary method 700 of FIG. 7, for example. In some embodiments, the processor-executable computer instructions 804 are configured to implement a system, such as at least some of the exemplary system 400 of FIG. 4 and/or at least some of the exemplary system 600 of FIGS. 6A-6H, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
maintaining primary reference counts for pages within a persistent memory of a node;
in response to receiving a first operation to link a page into a persistent memory file system of the persistent memory, incrementing a primary reference count of the page before linking the page into the persistent memory file system; and
in response to receiving a second operation to unlink the page from the persistent memory file system, unlinking the page from the persistent memory file system before decrementing the primary reference count.

2. The method of claim 1, comprising:
maintaining shadow reference counts for the pages, wherein the primary reference count and a shadow reference count are maintained for the page.

3. The method of claim 1, comprising:
in response to the node recovering from a crash, traversing the persistent memory file system to modify shadow reference counts of the pages.

4. The method of claim 3, comprising:
in response to encountering the page during the traversal, incrementing shadow reference counts of children pages that are children of the page and setting a visited field for the page to indicate that the traversal encountered the page.

5. The method of claim 3, comprising:
in response to completing the traversal, replacing values of primary reference counts of the pages with values of shadow reference counts of the pages.

6. The method of claim 3, comprising:
in response to receiving an operation targeting the page during the traversal, modifying the primary reference count of the page and refraining from modifying shadow reference counts for the page and children pages that are children of the page based upon a visited field for a parent page of the page being set to indicate that the traversal has not encountered the page.

7. The method of claim 3, comprising:
in response to receiving an operation targeting the page during the traversal, modifying shadow reference counts for children pages that are children of the page based upon a visited field for a parent page of the page being set to indicate that the traversal has encountered the page.

8. The method of claim 3, comprising:
in response to receiving an operation targeting the page during the traversal, incrementing a shadow reference count of a copy of the page created by the operation and decrementing a shadow reference count of the original copy of the page based upon a visited field for a parent page of the page being set to indicate that the traversal has encountered the page.

9. The method of claim 3, comprising:
in response to encountering the page during the traversal, incrementing shadow reference counts of children pages that are children of the page and refraining from modifying a shadow reference count of the page.

10. The method of claim 1, comprising:
in response to the primary reference count of the page being set to zero, freeing the page.

11. A non-transitory machine readable medium comprising instructions for performing a method, which when executed by a machine, causes the machine to:
maintain primary reference counts for pages within a persistent memory of a node;
in response to the node recovering from a crash:
maintain shadow reference counts for the pages to indicate a number of times a traversal of the persistent memory file system encounters the pages; and
traverse the persistent memory file system to update values of the shadow reference counts of the pages based upon the number of times the traversal encounters the pages; and
in response to completing the traversal, replace values of primary reference counts of the pages with values of shadow reference counts of the pages.

12. The non-transitory machine readable medium of claim 11, wherein the instructions cause the machine to:
   in response to encountering a page during the traversal, increment shadow reference counts of children pages that are children of the page and set a visited field for the page to indicate that the traversal encountered the page.

13. The non-transitory machine readable medium of claim 11, wherein the instructions cause the machine to:
   in response to encountering a page during the traversal, terminate recursion down the persistent memory file system based upon the page having a visited field set to indicate that the page has already been encountered during the traversal.

14. The non-transitory machine readable medium of claim 11, wherein the traversal sets a shadow reference count for a page to a number of times the page is encountered during the traversal.

15. The non-transitory machine readable medium of claim 11, wherein the instructions cause the machine to:
   in response to receiving an operation that is to create a new reference to a page during the traversal, increase a shadow reference count of the page.

16. The non-transitory machine readable medium of claim 11, wherein the instructions cause the machine to:
   in response to receiving an operation that creates a copy of a page as a copied page during the traversal, setting a visited field for the copied page to inherit a visited field of a parent page that is a parent of the copied page.

17. A computing device comprising:
   a memory comprising machine executable code for performing a method; and
   a processor coupled to the memory, the processor configured to execute the machine executable code to cause the processor to:
      in response to a node recovering from a crash, traverse a persistent memory file system of the node to modify shadow reference counts of pages within persistent memory of the node; and
      in response to completing the traversal, replace values of primary reference counts of the pages with values of shadow reference counts of the pages.

18. The computing device of claim 17, wherein the machine executable code causes the processor to:
   in response to receiving an operation that creates a copy of a page as a copied page during the traversal, setting a shadow reference count for the copied page to a first value based upon a visited field of a parent page indicating that the parent page was encountered by the traversal.

19. The computing device of claim 18, wherein the machine executable code causes the processor to:
   setting the shadow reference count to a second value based upon the visited field of the parent page indicating that the parent page has not been encountered by the traversal.

20. The computing device of claim 18, wherein the machine executable code causes the processor to:
   in response to the copied page having an inherited visited field indicating that a parent page of the copied page was encountered by the traversal, incrementing primary reference counts and shadow reference counts of child pages that are children of the copied page.

* * * * *